United States Patent
Gonzalez et al.

(10) Patent No.: US 9,895,812 B2
(45) Date of Patent: Feb. 20, 2018

(54) CONTROL DEVICE WITH MULTIDIRECTIONAL FORCE FEEDBACK

(71) Applicant: COMMISSARIAT A L'ENERGIE ATOMIQUE ET AUX ENERGIES ALTERNATIVES, Paris (FR)

(72) Inventors: Franck Gonzalez, Lormaison (FR); Florian Gosselin, Vanves (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 65 days.

(21) Appl. No.: 15/102,211

(22) PCT Filed: Dec. 4, 2014

(86) PCT No.: PCT/EP2014/076621
§ 371 (c)(1),
(2) Date: Jun. 6, 2016

(87) PCT Pub. No.: WO2015/082636
PCT Pub. Date: Jun. 11, 2015

(65) Prior Publication Data
US 2016/0332305 A1    Nov. 17, 2016

(30) Foreign Application Priority Data
Dec. 6, 2013 (FR) .................................... 13 62268

(51) Int. Cl.
*B25J 13/02* (2006.01)
*B25J 3/04* (2006.01)
*B25J 19/02* (2006.01)

(52) U.S. Cl.
CPC ............... *B25J 13/025* (2013.01); *B25J 3/04* (2013.01); *B25J 19/02* (2013.01)

(58) Field of Classification Search
CPC ... B25J 3/00–3/04; B25J 13/02; B25J 13/025; B25J 19/02; G05B 2219/40413; G06F 3/016
See application file for complete search history.

(56) References Cited

U.S. PATENT DOCUMENTS 6,704,694 B1 * 3/2004 Basdogan ............... G06F 3/016
                                                                                                             345/184
6,801,187 B2 * 10/2004 Stewart ................... G06F 3/016
                                                                                                             345/156

(Continued)

FOREIGN PATENT DOCUMENTS

DE    10 2007 053 008 A1    5/2009
FR           2 809 048 A1    11/2001

OTHER PUBLICATIONS

Motoki Takagi, et al. "A New Encounter Type Haptic Device with an Actively Driven Pen-tablet LCD Panel", Robotics and Biomimetics, 2011 IEEE, XP032166171, Dec. 7, 2011, pp. 2453-2458.

(Continued)

*Primary Examiner* — Adam R Mott
(74) *Attorney, Agent, or Firm* — Oblon, McClelland, Maier & Neustadt, L.L.P.

(57) ABSTRACT

A control device with force feedback including: a handle operated by a user, the handle including a grab area for taking hold by the user and a contact end secured to the grab area during at least part of operation of the control device; a robot including a terminal body including a contact area which can come into contact with the contact end; a mechanism measuring relative configuration of the handle and the terminal body; a controller controlling movement of the contact area relative to the contact end; the contact end being movable relative to the contact area during at least part of the operation of the control device, and the contact end and the (Continued)

contact area are shaped such that the robot applies to the handle a force feedback in at least two separate directions during at least part of the operation of the control device.

30 Claims, 21 Drawing Sheets

(56) References Cited

U.S. PATENT DOCUMENTS

| | | | | |
|---|---|---|---|---|
| 9,501,946 | B1* | 11/2016 | Kulkarni | G09B 9/00 |
| 2004/0099081 | A1 | 5/2004 | Riwan et al. | |
| 2005/0052714 | A1* | 3/2005 | Klug | G03H 1/22 |
| | | | | 359/3 |
| 2009/0102620 | A1* | 4/2009 | Kato | G06F 3/011 |
| | | | | 340/407.1 |
| 2009/0282331 | A1* | 11/2009 | Nagasaka | G06F 3/014 |
| | | | | 715/701 |
| 2011/0050405 | A1* | 3/2011 | Hollis, Jr. | G06F 3/016 |
| | | | | 340/407.2 |
| 2012/0071752 | A1* | 3/2012 | Sewell | A61B 6/12 |
| | | | | 600/424 |
| 2012/0221145 | A1 | 8/2012 | Ogawa | |
| 2014/0165770 | A1* | 6/2014 | Abri | G06F 3/016 |
| | | | | 74/490.01 |
| 2017/0024978 | A1* | 1/2017 | Gulrez | G06F 3/016 |

OTHER PUBLICATIONS

Masahiro Ishii et al., "A 3D Spatial Interface Device Using Tensed Strings", Presence: Teleoperators and Virtual Environments, vol. 3 (1), 1994, pp. 81-86.

Motoki Takagi, et al., "A new desk-top encounter-type haptic device with an actively driven pen-tablet LCD panel," Advanced Robotics, Feb. 5, 2013, 10 pages.

Florian Gosselin, et al., "Specification and design of a new haptic interface for maxilla facial surgery," 2011 IEEE International Conference on Robotics and Automaton, May 9-13, 2011, pp. 737-744.

Y. Tsumaki, et al., "Design of a Compact 6-DOF Haptic Interface," Proceedings of the 1998 IEEE International Conference on Robotics & Automation, May 1998; pp. 2580-2585.

Seahak Kim, et al., "Tension Based 7 DOFs Force Feedback Device: SPIDAR-G," Transactions on Control, Automation, and Systems Engineering; vol. 4; No. 1, Mar. 2002, pp. 9-16.

Michael Ortega, et al., "Prop-Based Haptic Interaction with Co-location and Immersion: an Automotive Application," IEEE International Workshop on Haptic Audio Visual Environments and their Applications, Oct. 1-2, 2005, 6 pages.

Masahiro Ishii, et al., "A 3D Spatial Interface Device Using Tensed Strings," Presence, vol. 3, No. 1, 1994, pp. 81-86.

International Search Report dated Mar. 17, 2015 in PCT/EP2014/0776621 Filed Dec. 4, 2014.

French Search Report dated Sep. 25, 2014 in FR 13 62268 Filed Dec. 6, 2013.

* cited by examiner

CONTROL DEVICE WITH MULTIDIRECTIONAL FORCE FEEDBACK

TECHNICAL FIELD AND PRIOR ART

The present invention relates to a control device with multidirectional force feedback that can be implemented as a haptic interface, as a master arm of a master-slave system or as a driving device of a collaborative robot.

Haptic interfaces, master arms for remote operation and collaborative robots are formed of multi-articulated mechanical chains including several movable bodies connected together by passive or motorised articulations connecting a fixed or movable base to one or more handles grabbed by the user. The user grabs and moves the handle(s) of which the movements are transmitted to all of the bodies of the robot and measured in general by joint sensors or sensors arranged at the level of the motors. This measurement is used to generate a control signal for an avatar in virtual reality or for a remote robot in remote operation or to activate power assistance modes in cobotics. When the avatar or the remote robot comes into collision with their environment or when power assistance modes are activated, the motors of the robot make it possible to apply a force feedback or a guiding on the hand of the user. The more "transparent" they are, the more these interfaces are intuitive and efficient, that is to say that the user does not feel their presence and has the impression of intervening directly in the virtual or remote environment. He must in particular be able to move as freely as possible in free space and to feel clearly contacts with the environment. This requires specific designs minimising in particular the friction and the inertia of the robot.

Yet the handle, which may be for example a standard handle or a pen, is connected in a permanent manner to the robot of which the bodies are themselves connected together. Thus, when the user moves the handle to control his avatar or a remote robot, he moves at the same time the whole of the robot. Even if this is optimised to be as transparent as possible, the user will feel the friction and the inertia of the whole of the robot. Thus the free space will not be perceived as truly free. Furthermore the sensorial (tactile and kinaesthetic) sensors of the user are permanently called upon and are less sensitive to changes in the environment. In particular the passage from free space to contact will be felt less clearly than in the real world.

The document Motoki Takagi, Jumpei Arata, Akihiro Sano, Hideo Fujimoto, *A new desktop encounter-type haptic device with an actively driven pen-tablet LCD panel*, J. Advanced Robotics, Vol. 27, No. 6, February 2013, pp. 407-415 describes an example of device wherein the effector and the robot are separate. This device comprises a graphic tablet of Wacom® type and a stylet operated by the operator. The tablet is mounted at the end of a parallel robot and the stylet is pinpointed in space by an optical system. The tablet is then moved in front of the stylet as a function of the movements of the stylet. The force feedback is managed by the actuators of the parallel robot as a function of the level of pressure applied by the stylet on the tablet and captured by the tablet. Due to the fact that the stylet is separate from the tablet, transparency is ensured in free space. However the force feedback applied to the stylet only has a single direction which is the direction normal to the tablet. Moreover, this force feedback is unilateral, that is to say that the stylet, respectively the tablet, can only push on the tablet, respectively on the stylet, and not, respectively, pull it.

DESCRIPTION OF THE INVENTION

It is consequently an aim of the present invention to offer a control device with force feedback offering very great transparency or even perfect transparency in free space while offering improved force feedback.

The aforementioned aim is attained by a control device comprising an element operated by the operator (also called interaction element) provided with a contact end, a robot provided with a contact area with which said contact end can come into contact, said contact end being movable relative to the contact area during at least part of the operation of the control device, means for measuring the relative configuration of said element relative to the robot and a controller managing the following without contact, the placing in contact of the robot and said element and the force feedback once the robot and the element are in contact. The robot, the contact area, the operated element and the contact end are such that the control device can ensure multidirectional force feedback.

In other words, the control device is an intermittent contact device making cooperate a contact end and a contact area of which the shapes are such that the contact area can apply forces to the contact end in at least two separate directions.

In an advantageous manner, the force feedback is bilateral in at least one direction. "Bilateral force feedback" is taken to mean force feedback that can apply in both senses along a given direction.

The means for measuring the relative configuration of the operated element relative to the robot may advantageously be incorporated in the body situated at the end of the robot and comprising the contact area. Emitters and sensors could further be placed on the handle and on this contact area. Thus the measurement of the relative position of the handle relative to the robot is known in a simple and precise manner.

In another embodiment, temporary securing means may be provided between the contact area and the contact end. The force feedback may then be multidirectional, bilateral and without play in contact.

In another embodiment, the contact area is "deformable" such that the gap between the contact end and the contact area diminishes in several directions simultaneously when contact is arrived at. It is thus possible to simulate in a very realistic manner fine insertions with successive contacts on the opposite sides of the hole.

In an example of realisation, the operated element is totally detached from the robot bearing the contact area. The contact area is for example formed by a cavity and the element has the shape of a stylet of which one end has a shape corresponding to that of the cavity. When the contact end of the stylet comes into contact with the cavity, force feedbacks along several directions may be applied to the stylet, for example axial force feedbacks relative to the stylet but also transversal force feedbacks.

In another example of realisation, the contact end of the operated element is "encompassed" by the contact area, and the operated element is separate from the contact area with a play in at least one given direction. Thus the operated element is free to move over a stroke equal to a given play and when it has travelled this play in the given direction, it comes into contact with the contact area which can apply a force feedback to it. For example, the operated element comprises at its contact end a sphere and the contact area forms a spherical housing of which the inner diameter is greater than that of the sphere, the sphere being mounted in the spherical housing in an inseparable manner in operation. The nominal play is thus that between the outer radius of the sphere and the inner radius of the housing, and the force feedback is obtained by the placing in contact of the sphere and the spherical housing. This device enables a force feedback that is translational in all directions and bilateral in all directions.

The subject matter of the present invention is then a control device with force feedback comprising:
- a handle intended to be operated by the user, said handle comprising at least one grab area for taking hold by the user and at least one contact end secured to the grab area during at least part of the operation of the control device,
- a robot provided with at least one terminal body comprising at least one contact area, said contact area being able to come into contact with the contact end of the handle,
- means for measuring the relative configuration of the handle relative to the terminal body,
- a controller capable of managing the movement of the contact area relative to the contact end in an operating state without contact, in an operating state of placing in contact the contact area and the contact end and in an operating state in contact during which a force feedback may be applied to the handle through the contact end,
- the contact end being movable relative to the contact area during at least part of the operation of the control device,
- wherein the contact end and the contact area are shaped such that the contact area is capable of applying forces on the contact end in at least two separate directions such that the robot applies to the handle a force feedback in said at least two separate directions.

According to an example of realisation, the contact end or the contact area may form a cavity and the contact area or the contact end is shaped such that it is housed at least in part in said cavity. A play may exist between the inner surfaces of said cavity of the contact end or the contact area and the outer surfaces of the contact area or the contact end, such that the relative movement of the contact end and the contact area is limited in all directions.

For example the contact end has a spherical shape and the contact area has a corresponding spherical shape or the contact end has a parallelepiped shape and the contact area has a corresponding parallelepiped shape.

According to another example of realisation, the contact area or the contact end form a cavity from which the contact end or the contact area is free to exit. The contact end may have a cylindrical lateral wall and a hemispherical end wall and the contact area may have a corresponding shape or the contact end may have a conical or truncated cone lateral wall and the contact area may have a corresponding shape.

In an embodiment, the contact area and/or the contact end may have a fixed shape.

In another embodiment, the handle and/or the terminal body comprise a deformable element to come into contact with the terminal body and/or the handle respectively when it is deformed.

It is advantageously the contact area and/or the contact end which are deformable.

The contact area and/or the contact end are for example delimited by several surfaces of which at least one is movable relative to the other surfaces.

In an example of realisation, the contact area and/or the contact end are formed at least in part by a flexible wall, the placing in contact between the contact area and the contact end being ensured at least in part by the deformation of the flexible wall. The flexible wall may delimit a closed chamber, said device comprising a reservoir of material in the form of fine powder and means for supplying the closed chamber, on command of the controller.

The measurement means may comprise a camera or a time of flight camera arranged so as to film the handle and the terminal body, means for processing the images supplied by the camera and advantageously a lighting device. For example, the handle and/or the terminal body comprise at least one locating target.

According to an additional characteristic, one or more targets may emit a signal making it possible to distinguish them from the other targets.

According to another additional characteristic, the measurement means may be arranged on the handle and the terminal body, said measurement means comprising locating elements on the handle or the terminal body and sensors of said locating elements.

The locating elements are for example light emitting diodes and the sensors are phototransistors.

According to another additional characteristic, the control device with force feedback comprises means for temporary securing the handle and the terminal body. Advantageously, the temporary securing means are such that the securing is eliminated when a sufficient force is applied to the contact end. As an example, the temporary securing means are magnetic or mechanical means.

Alternatively, the temporary securing means are controllable so as to enable a cancellation of the securing on command, and are for example of electromagnetic type.

Advantageously, the control device with force feedback comprises at least one alignment system automatically modifying the relative configuration of the handle and the terminal body of the robot in orientation, for example of magnetic type.

According to another additional characteristic, the control device with force feedback may comprise means for detecting contact between the contact end and the contact area.

According to another additional characteristic, the control device with force feedback may comprise at least two contact areas and at least two contact ends, the two contact areas being movable with respect to each other and/or the two contact ends being movable with respect to each other.

The robot may be a serial robot with six degrees of freedom, a hybrid robot with 6 degrees of freedom, a parallel robot with three degrees of freedom or a parallel robot with two or three degrees of freedom.

The subject matter of the present invention is also a haptic interface comprising a control device with force feedback according to the invention and a simulation software.

The subject matter of the present invention is also a master robot and slave robot system comprising a control device with force feedback according to the invention and a slave robot, the master robot being formed by the robot of the control device.

The subject matter of the present invention is also a collaborative robot comprising a control device with force feedback according to the invention and an effector acting on the environment, mounted on the terminal body or on a separate body.

BRIEF DESCRIPTION OF THE DRAWINGS

The present invention will be better understood with the help of the description that follows and the drawings in which.

DETAILED DESCRIPTION OF PARTICULAR EMBODIMENTS

Figure 1:
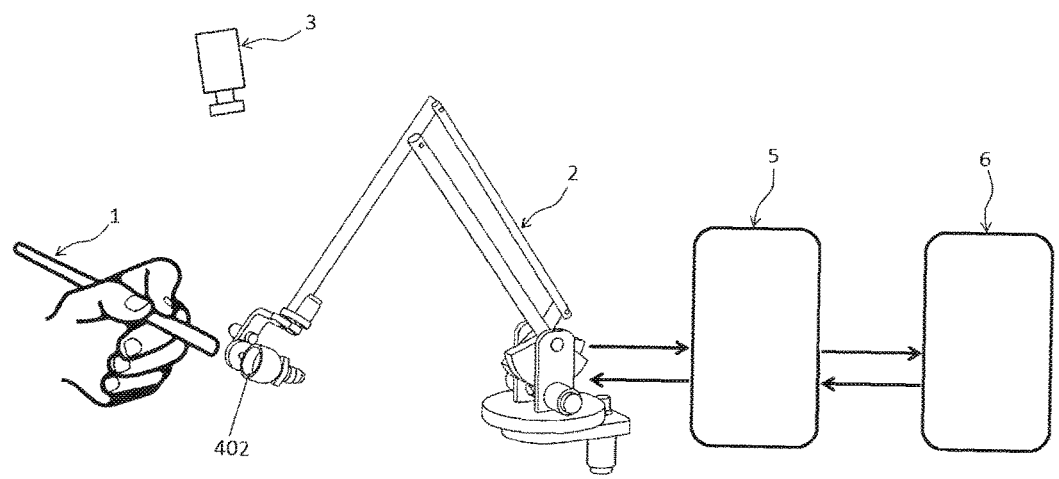
FIG. 1 is an overall schematic representation of the control device according to the invention.

The control device according to the invention comprises an element that is operated directly by the user, this element is generally designated "handle". This handle is the handle of a robot which may be a master arm, a haptic interface or a collaborative robot called "cobot". Sensors situated on this robot make it possible to measure the movements of the handle and/or the forces applied thereto. These measurements are transmitted to the controller of the robot which is going to calculate the position or force controls to apply to the different axes of the robot to follow the movements of the user and/or apply a force feedback as a function of the interactions between the device that the robot drives and its environment and/or the configuration of the robot and the handle.

The controlled device may be for example a slave robot in the case of remote operation. In general, the slave arm, advantageously equipped with a gripper, for example a clamp, is driven to follow the movements of the master arm whereas the master arm is driven to follow those of the slave. This is then known as bilateral positional coupling, well known to those skilled in the art and which will not be detailed herein. Other coupling modes are also possible, which will not be detailed either. When the slave robot is in free space, it follows the movements of the master arm. The master arm is then only placed in motion by the movements of the user. It is said that it is itself in free space. When the slave robot and in particular its gripper comes into contact with their environment, the slave robot is blocked (or at least its movements are constrained). The master robot, of which the position is enslaved on that of the slave, is then also blocked (or at least its movements are also constrained). It is said that it is in contact. The operator may apply forces to the handle without said handle moving freely. It is these forces that he feels. This is known as force feedback.

The controlled device may further be an avatar of the handle of the haptic interface in Virtual Reality. The operation is similar to that observed in remote operation. The avatar is driven to follow the movements of the handle of the haptic interface whereas the haptic interface is driven so that its handle follows those of the avatar. A bilateral positional coupling, or any other coupling mode may also be advantageously used here. When the avatar is in free space, it follows the movements of the handle. It is then said that it is in free space. When the avatar comes into contact with its environment, it is blocked (or at least its movements are constrained). The haptic interface, of which the position is enslaved on that of the avatar, also has constrained movements. It is said that it is in contact.

Such a device may also be used as collaborative robot or cobot. In this case the robot is equipped both with a handle enabling the operator to operate it and an effector, for example a clamp bearing a tool, making it possible to act on the environment. The handle and the effector may both be at the level of the terminal organ of the cobot or be arranged on separate bodies of the cobot. When the effector moves in free space and when the power assistances of the cobot are not activated, the position of the cobot is imposed by the operator. It is said by analogy with the preceding cases that it is in free space. On the other hand, if the effector or the object that it transports comes into contact with the environment, the movements of the cobot are constrained, thus those of the handle are also constrained. It is said by analogy with the preceding cases that it is in contact. In the same way, if power assistances are engaged as a function for example of the position of the cobot or the pressing on certain control buttons, these power assistances, which may be for example exclusion areas or guidings along given trajectories, are going to constrain the movements of the handle. It will also be said that said handle is "in contact".

It will be noted that the power assistance and guiding functions may also be implemented on master arms and haptic interfaces. It is also said that these devices are in contact when these power assistances constrain the movements of their handle.

In FIG. 1 may be seen a schematic representation of the principle of the invention.

The control device comprises a handle 1 intended to be operated by the user, a robot 2 provided with a contact area 402 intended to come into contact with the handle 1, means for measuring 3 the relative configuration of the handle 1 and the contact area 402, that is to say measuring the position and/or the orientation of the handle relative to the contact area, and control means 5 incorporating control laws managing the following without contact, the placing in contact of the robot and the handle at the level of the contact area and the force feedback once the robot and the handle are in contact.

As mentioned above, the control device may be associated with a virtual reality simulation, with a remotely operated robot, or with a device for managing power assistance modes in cobotics, here referenced 6 in a generic manner, and of which the information items are used by the controller for managing the placing in contact of the robot and the handle.

In this document, the same reference signs will be used to designate elements having a similar function. Furthermore, certain elements not visible in the drawings, and thus not represented for reasons of clarity, are nevertheless designated by a numerical reference to facilitate the explanations.

A first embodiment of the control device according to the invention will now be described.

Figure 2:
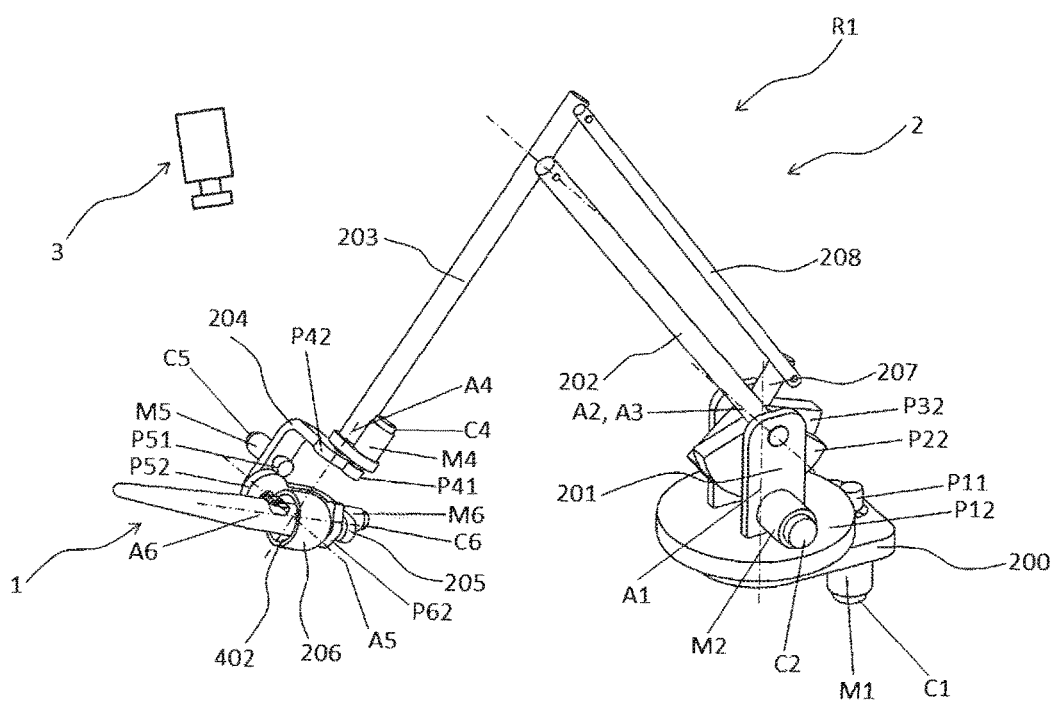
FIG. 2 is a perspective view of a first example of control device according to a first embodiment.
Figure 3A:
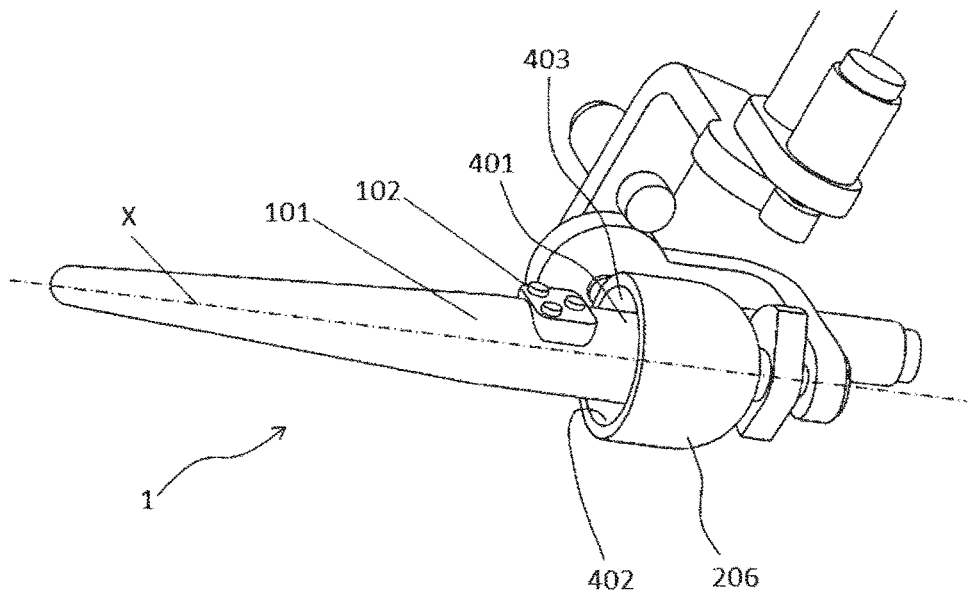
FIGS. 3A and 3B are detail views of the device of FIG. 2 in perspective and in partial section at the level of the interaction element according to the first example of realisation.
Figure 3B:
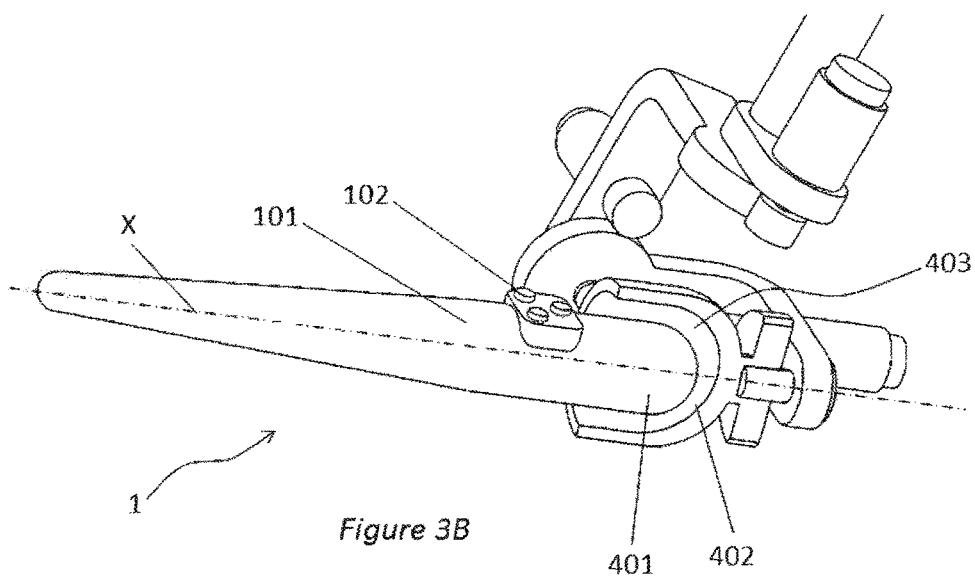

In FIG. 2 may be seen a first example of realisation of a control device according to a first embodiment, and in FIGS. 3A and 3B may be seen detail views of the device of FIG. 2.

In FIG. 2 may be seen the control device represented without the controller.

In the example represented, the robot 2, also designated R1, has a serial structure. It comprises a base 200 which may be fixed or movable. In the case where the base 200 is movable, means for measuring its movements are provided. Movable bodies 201, 202, 203, 204, 205 and 206 are articulated on the base according to a serial kinematic chain. The body 201 is rotationally movable around an axis A1 relative to the base 200. Its movements may be controlled around the axis A1 by the actuator M1 fixed on the base 200 and equipped with a position sensor C1 via the reducer formed of drive P11 and driven P12 pulleys to which is connected the body 201. The body 202 is rotationally movable around an axis A2 relative to the body 201. Its movements may be controlled around the axis A2 by the actuator M2 fixed on the body 201 and equipped with a position sensor C2 via the reducer composed of drive P21 (not visible) and driven P22 pulleys to which is connected the body 202. A connecting rod 207 is rotationally movable around an axis A3, relative to the body 201. In the example represented, the axis A3 is merged with the axis A2. Its movements may be controlled around this axis by an actuator M3 (not visible) fixed on the body 201 and equipped with a position sensor C3 (not visible) via the reducer composed of drive P31 (not visible) and driven P32 pulleys to which is connected a body 207. The body 203 is rotationally movable relative to the body 202 around an axis parallel to the axis A2. Its movements are controlled by the motor M3 via the parallelogram mechanism formed of the bodies 202 and 203, the connecting rod 207 and a slave connecting rod 208. This device is known to those skilled in the art and will not be detailed. A body 204 is rotationally movable relative to the body 203 around an axis A4. Its movements may be controlled around the axis A4 by the actuator M4 fixed on the body 203 and equipped with a position sensor C4 via the reducer composed of drive P41 and driven P42 pulleys to which is connected the body 204. A body 205 is rotationally movable relative to the body 204 around an axis A5 that is non-parallel and advantageously concurrent and perpendicular to the axis A4. Its movements may be controlled around this axis by the actuator M5 fixed on the body 204 and equipped with a position sensor C5 via the reducer composed of drive P51 and driven P52 pulleys to which is connected the body 205. A body 206 is rotationally movable relative to the body 205 around an axis A6 that is non-parallel and advantageously concurrent and perpendicular to the axis A5 and concurrent with the axis A4. Its movements may be controlled around this axis by the actuator M6 fixed on the body 205 and equipped with a position sensor C6 via the reducer composed of drive P61 (not visible) and driven P62 pulleys to which is connected the body 206. The contact area 402 is situated on the body 206.

The contact area 402 is intended to be moved as a function of the movements of the handle 1.

The motors M1 to M6, in association with the sensors C1 to C6 and with the reducers P11-P12 to P61-P62, make it possible to control the position of the terminal body 206 of the robot where the contact area 402 is situated, notably when the operator moves in free space, and to guide or to oppose the movements of the user, notably when the user places the handle 1 in contact with the contact area 402 or moves the handle in contact.

These motors, sensors and reducers may be of any suitable type. The motors may thus be advantageously direct current electric motors with ironless rotor or brushless motors, but also and in a non-limiting manner conventional direct current motors, shape memory alloys, piezoelectric actuators, pneumatic or hydraulic actuators.

Alternatively, on one or more axes, brakes could be used instead of all or part of the motors, these brakes being able to be notably and in a non-exhaustive manner disc brakes, powder brakes or magnetorheological or electrorheological fluid brakes. In the case where one or more axes of the brakes are implemented, the device will only be able to oppose the movements of the user and will not be able to act on him in an active manner.

In a further variant, hybrid actuators associating a motor and a brake of all the types presented previously or others could be used.

It could also be possible in a variant to use on one or more axes of antagonistic actuating devices and/or devices with variable stiffness of "series elastic actuators" or "parallel elastic actuators" type.

The reducers, here represented schematically, could advantageously be wire capstans but they could also be, in a non-exhaustive manner, reducers with simple or epicyloidal gearing, with one or more stages, reducers of "Harmonic Drive" type or ball screw reducers. In a variant, non-reversible reducers such as wheel and endless screw reducers could be used. In all cases and more particularly in the case of the use of motors and/or reducers with low efficiency and/or having important friction or little or not reversible, it could be possible to advantageously use at the level of the motors, at the level of the articulations of the robot or at the level of its base or its end force sensors of which the signals could be used to compensate these defects and make the robot reversible and/or more transparent.

The sensors may be of any suitable type, in particular and in a non-exhaustive manner optical encoders, Hall effect sensors, potentiometers or magneto-optic encoders. These sensors may be absolute (multiturn) or relative.

In particular, in FIG. 2, the sensors are represented on the motors. All or part of them could also be placed on the articulations of the robot. It could further be possible to have on one or more axes sensors both on the motors and on the articulations.

It will be noted that in FIG. 2 and the other figures described, kinematic links are represented in a schematic manner. These could advantageously be implemented by means of ball bearings, journal bearings, magnetic bearings or any other solution known to those skilled in the art. In the same way the links are represented in a simplified manner as cantilevered. It could be advantageous to implement clevis links, that is to say with a take up of forces on each side of the link without going beyond the scope of the invention, in particular for the rotational guiding of the pulleys of the reducers of which the forces could advantageously be taken up by bearings or ball bearings on the side of the pulleys opposite the motors. These elements are known to those skilled in the art and are thus neither represented nor explained. The reducers are also represented in a schematic manner. The teeth of the gears or the capstan wires are not represented for the purposes of clarity of the figures. In the case of the use of capstans, it would also be advantageous to machine a helix profile on the pulleys and to provide guiding and wire tension systems. These elements are known and will not be detailed herein. Furthermore, in the figures, the different bodies of the robots and the handles are represented in a one-piece manner. It is clearly understood that this representation is only schematic. It is intended to facilitate the reading of the figures. In practice, these parts could be preferably formed of several elements assembled together.

In FIGS. 3A and 3B may be seen in detail the handle and the contact area 402 according to a first example of realisation of the first embodiment.

The handle comprises a grab shaft 101 intended to be held in the hand by the user and an area intended to come into contact with the contact area 402 borne by the terminal body 206 of the robot 2.

In the example represented, the handle has the shape of a stylet of longitudinal X axis and of which the longitudinal end 401, designated "contact end 401" is intended to come into contact with the contact area 402.

The contact area 402 according to the invention is formed by the inner surface of a cavity 403 into which is intended to penetrate the contact end 401.

In the first example of realisation, the handle 1 is entirely independent of the robot, it may be moved away from the contact area 402 by the distance desired by the user in the direction of the X axis.

The contact end 401 and the contact area 402 advantageously have similar shapes to within a scale factor. In the example represented, the contact end has a cylinder portion terminated by a hemisphere and the inside of the cavity is delimited by a cylinder portion closed at one end by a hemisphere.

Thus the device will have a homogeneous behaviour in all directions since in a nominal configuration the distance to cover before contact is the same in all directions. The distance separating the areas 401 and 402 is chosen advantageously to be sufficiently large so that the robot is never in contact with the handle in free space, and whatever the movements of the user, and sufficiently small so that contact takes place rapidly when it is desired. It will be understood that the absence of contact whatever the movements of the user is to be considered relative to a given range of movements as a function of the use.

For example, during the simulation or the driving of the insertion of one part into another, successive contacts often appear on each side of the part that is being inserted. Thanks to the invention, by choosing a sufficiently small distance, it is ensured that the contact area 402 can rapidly go from one side to the other of the end 401, and these insertion forces are restored efficiently.

In the example represented, the handle 1 is also equipped with buttons 102, for example three in number and serving for example to launch particular operating modes, such as for example the grabbing of an object, the shifting or the activation of a virtual guide.

The handle could further be equipped with a fail-safe type device. To measure the state of the buttons and the fail-safe device, the handle could be connected to the controller of the robot by wires. It could further be equipped with a specific electronic circuit provided with a wireless transmission system, for example of Wifi or Bluetooth type, and batteries or cells, to send these information items back to the controller. These elements are known to those skilled in the art and will not be described in detail herein.

The measurement means 3 making it possible to know at any instant the relative position of the handle 1 relative to the terminal body 206, and thus the relative position of the contact end 401 relative to the contact area 402, will be described hereafter.

Knowledge of this relative position makes it possible to drive the device thanks to the controller such that the robot remains at a distance from the handle in free space in order to avoid contact or quite the reverse to come into contact with it at the desired moment and at the desired places of the contact end 401 and the contact area 402, or finally that they remain in contact.

Since the handle of the device of FIGS. 3A and 3B is revolving, the motor M6 and the sensor C6 could be omitted.

The operating principle of the system integrating the control device of FIGS. 3A and 3B will now be described with the help of the flow diagram of FIG. 29.

The user grabs the handle 1. The sensors C of the robot make it possible to know at any instant the absolute configuration of the terminal body 206 in space, designated CONF2. This information is designated INF2. The measurement means 3 measure the real configuration of the handle, designated CONF1, and make it possible to know the absolute configuration of the handle in space and the relative configuration of the handle relative to the robot. These information items are designated respectively INF1 and INF3. In the example represented in FIG. 29, the measurement means 3 make it possible to measure the relative configuration of the handle relative to the robot, which is the case notably when so-called "internal" means for measuring are used and which will be described hereafter. The absolute configuration of the handle is then obtained by combining this information with the information of absolute position of the end of the robot. It is clearly understood that the measurement means 3 could also, without going beyond the scope of the invention, make it possible to measure the absolute configuration of the handle in space, which is the case notably when so-called "external" means for measuring are used and which will be described hereafter. The relative configuration of the handle relative to the robot is in this case obtained by combining this information with the information of absolute position of the end of the robot.

These information items are transmitted to the slave robot B or to the simulation software B in the case of a haptic interface or to the power assistance management device B in the case of a cobot. Furthermore, the simulation software or the sensors of the slave robot or the cobot make it possible to know at each instant the absolute configuration of the avatar or the slave robot or the effector of the cobot, this information is designated INF4, and its distance to surrounding real or virtual objects, this information is designated INF5. These information items are sent to a corrector R forming part of the controller of the robot which combines and processes them to control the motors M of the robot which make it possible, as a function of the model E of the robot, to control the real configuration CONF2 of the terminal body 206, and the simulation software or the motors of the slave robot or the cobot make it possible to modify the configuration, designated CONF4, of the avatar or the slave robot or the effector of the cobot respectively.

The device may have three operating states:

Operating state in free space: when the avatar or the slave robot or the cobot are at a distance from their environment and when their movement is not constrained by power assistances, the system is designated as in free space. The configuration of the controlled device is then enslaved on that of the handle 1 and that of the robot 2 on that of the controlled device. Thus the robot 2 follows the movements of the handle imposed by the user, to within the dynamic of these systems. The contact end 401 and the contact area 402 remain at a distance from each other.

Free space-contact transition: when the avatar or the slave robot or the cobot come into contact with their environment and/or when power assistances constraining their movements are activated, their movement is restricted or blocked. The robot 2, which is then still enslaved to follow the movements of the controlled device, it thus itself also going to see its movement restricted or be blocked. The handle 1 still operated by the user and which is, for its part, free, is then going to come closer to the robot and the contact end 401 and the contact area 402 are going to come into contact. This transition is all the more rapid and thus the contact all the more realistic for tasks such as insertions requiring successive rapid contacts when the distance between the surfaces 401 and 402 is small. The distance is however sufficient so that they do not come into contact in free space. It will be noted that since the controlled device is blocked in contact with its environment, the movement of the handle up to coming into contact with the robot may be seen as a penetration into the environment or a protrusion of the handle relative to the avatar or to the slave robot or to the cobot. This protrusion is all the less when the distance between the contact end 401 and the contact area 402 is small.

Operation in contact: once the handle is in contact with the terminal body of the robot, it may be position or force controlled. In the case of position control, its configuration is enslaved on that of the slave. This being blocked, the robot 2 is also blocked, as well as the handle since this is in contact with the robot. In the case of force control, the robot is directly enslaved to apply to the handle the same forces as those applied to the avatar and supplied by the simulation software or to the robot, measured by its sensors and supplied by the slave controller. In both cases the user feels a force feedback in contact.

The second state (free space-contact transition) is also that in which the system finds itself during contact-free space transitions: when the user moves the handle so as to move the avatar or the slave robot in a direction opposite to their environment, the avatar or the slave robot is going firstly to remain in contact with its environment as long as the protrusion of the handle relative to it has not returned to zero since the avatar or the slave is still enslaved in position on the handle which is seen by it as situated inside the environment. Then, the avatar or the slave is going to follow the movements of the handle and will be no longer contact with its environment. The system then finds itself in free space. In order that the time shift between the movement of the handle and that of the robot is small, a small distance between the surfaces 401 and 402 is required.

Figure 29:
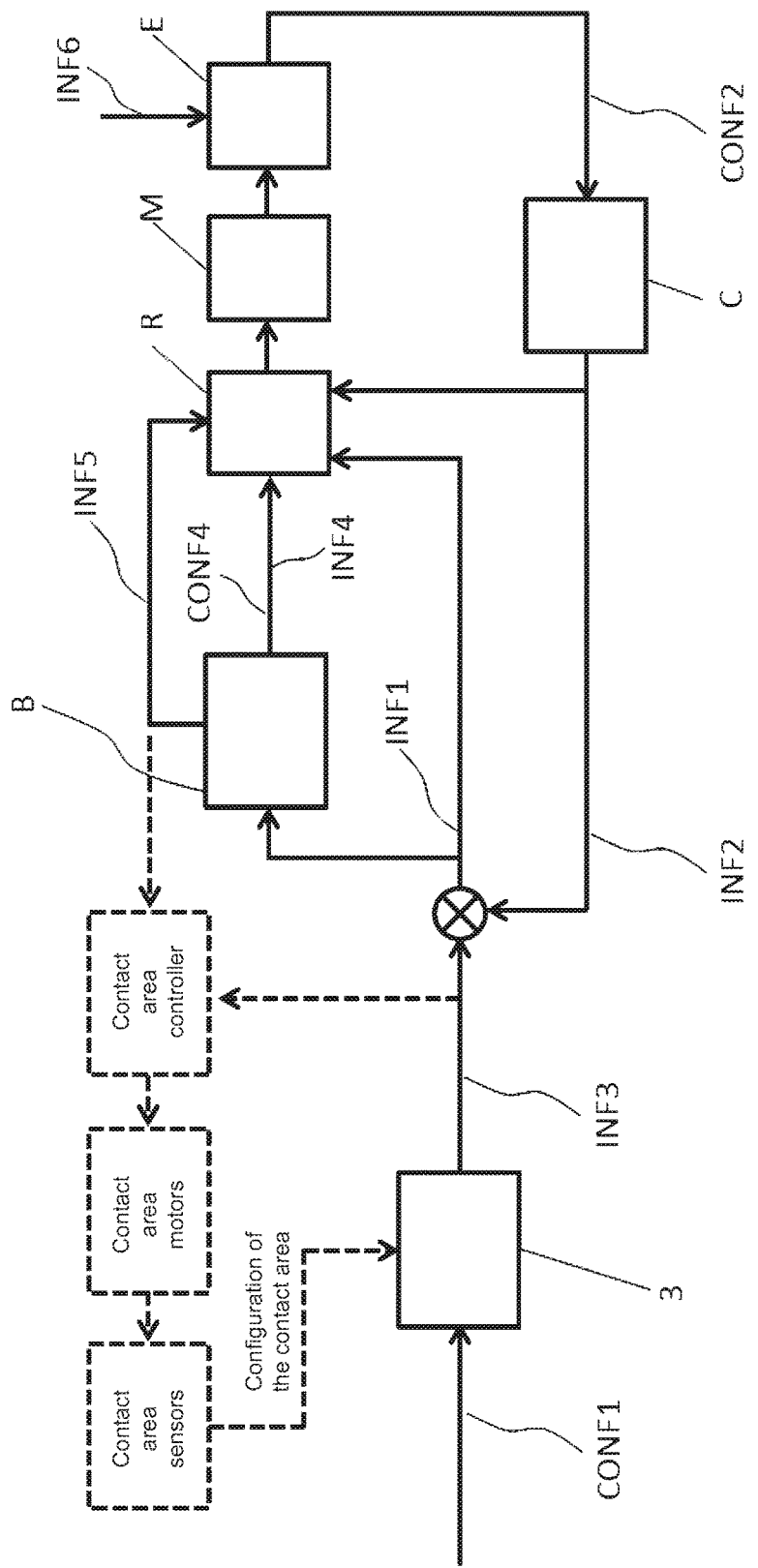
FIG. 29 is a flow diagram illustrating the operating principle of the invention.

In the example represented in FIG. 29, the corrector R uses the information items INF1, INF2, INF4 and INF5. It could also use other combinations of information items INF1 to INF5 without going beyond the scope of the invention. Any other type of control of the robot and/or of the controlled device could also be used, subject to enabling the management of these three operating states. It could be for example possible to introduce position and/or force amplification factors between the handle and the controlled device. A speed control could also be used, notably in free space, or a control switching between position and speed control as a function of the movements of the handle. Certain movements could further be constrained, for example by means of virtual guides. All these elements are known and will not be detailed.

The robot may be position controlled in free space and in contact. It may also be position or speed controlled in free space and force controlled in contact. In this case a switching will be made between position control in free space and during transitions and force control in contact. Since these control modes are very different, instabilities may appear if the switching does not take place exactly when the surfaces 401 and 402 come into contact on account of errors or imprecision in the measurement of the relative configuration of the position of the handle and the terminal body of the robot. A contact detection device may then be advantageously used between the handle and the robot, this information making it possible to trigger the transition even if the gap measured on their configurations is not zero, in order to avoid the appearance of instabilities on changing from one control mode to another. Such a contact detection device will be described in greater detail hereafter in relation with FIG. 14.

Thanks to the invention, the force feedback applied by the robot to the handle is multidirectional on account of the enveloping shape of the contact area. The contact area can apply a force opposing the movement of the handle in several directions.

This example of realisation further enables bilateral force feedbacks along substantially transversal directions relative to the X axis of the handle.

Figure 4A:
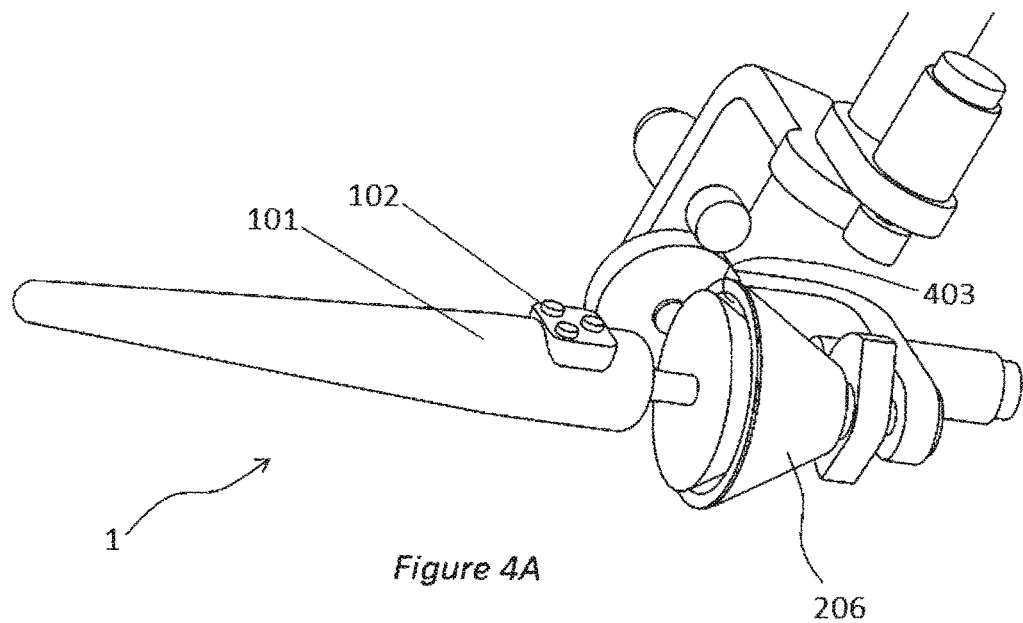
FIGS. 4A and 4B are detail views of a variant of the device of FIGS. 3A and 3B in perspective and in partial section at the level of the interaction element.
Figure 4B:
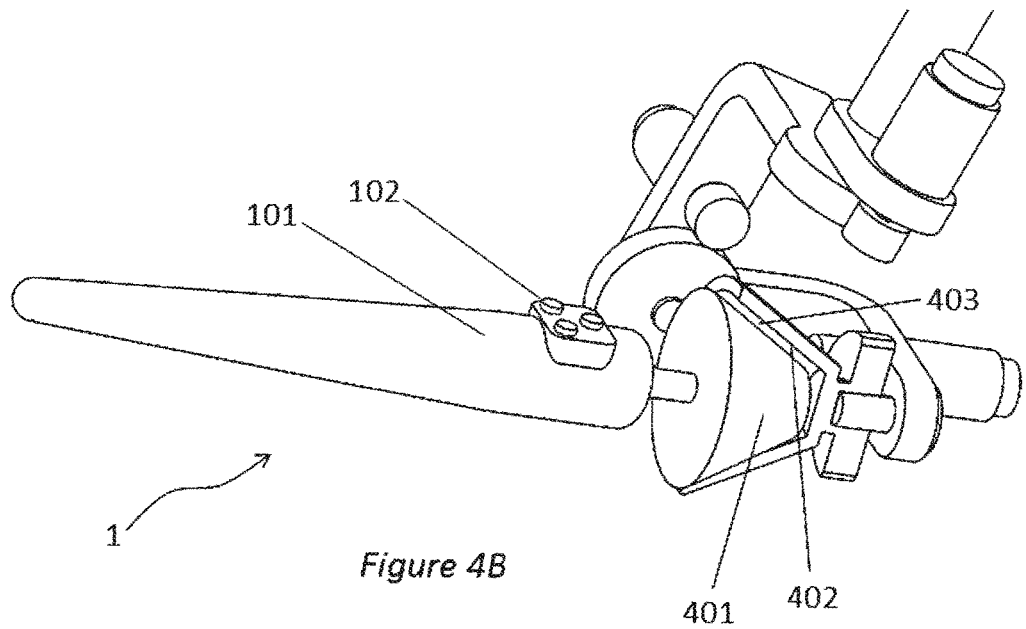

In FIGS. 4A and 4B may be seen a variant of the control device of the first example of realisation wherein it is the shape of the contact end and that of the contact area which differ. In this variant, the contact end 401 has a truncated cone shape and the cavity 403 has a corresponding truncated cone shape of same dimensions. Thus, and unlike the case illustrated by FIGS. 3A and 3B, the handle and the terminal body 206 are in contact over the whole perimeter of the contact end 401 and the contact area 402 after their coming into contact. In this case their relative distance is zero, which makes it possible to simulate insertions even more easily.

This first example of realisation wherein the handle is partially free to move relative to the terminal body has the advantage of making it possible to change tool very easily. It suffices to take out the handle used for example after having pressed on one of the buttons to indicate to the controller that the tool is going to be changed, then to grab another tool and to place the contact end 401 of this new tool facing or in contact with the contact area 402, and finally to indicate to the system that it is ready to use the new tool, for example by pressing on a control button.

The different tools will be advantageously equipped with recognition means, such as for example and in a non-exhaustive manner a bar code, a flash code, a bubble tag, an active or passive RFID tag, a local colour code, or any other means of recognition, and the robot will advantageously be equipped with a device for reading these elements. These devices and their reading means are known to those skilled in the art and are not detailed herein. The information on the type of handle used is designated INF6 in FIG. 29. It may be used to update automatically models of the robot, for example to take into account handles of different shapes and/or lengths, and to ensure that the force feedback is always correct in the hand of the user whatever the handle used.

It will be clearly understood that it could also be uniquely the grab area 101 or the grab area 101 and the buttons 102 which are interchangeable. In this case these elements would be advantageously separable from the end 401 and provided with the recognition means described previously. Obviously it would also be possible to change the grab area 101 or the whole handle 1 with the other examples or variants or embodiments.

Figure 7A:
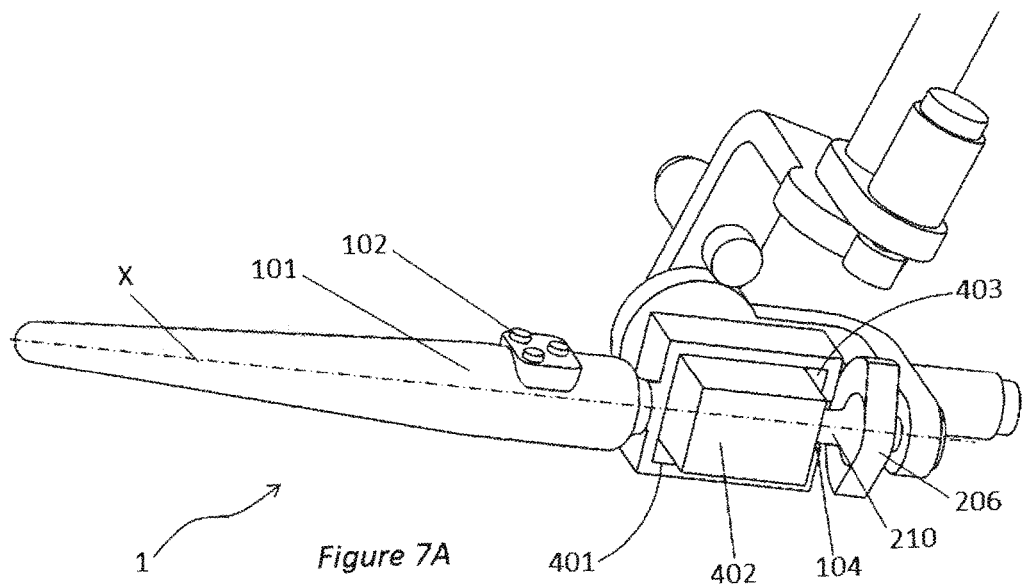

It is also clearly understood that it could also be the contact end 401 which forms a cavity into which the contact area 402 is inserted as is illustrated in FIG. 7A.

Figure 5A:
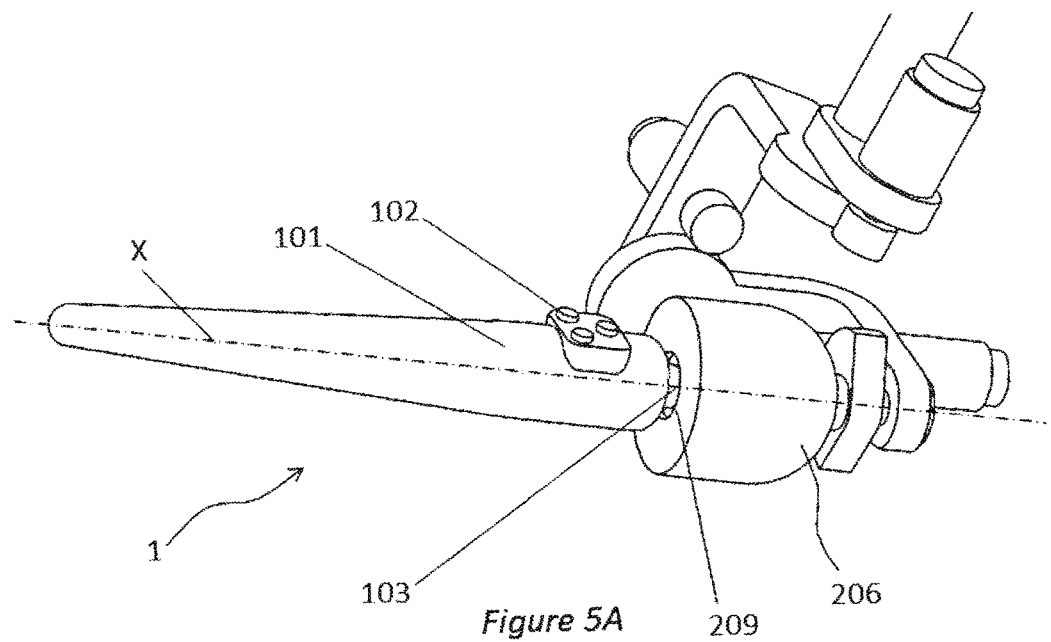
FIGS. 5A and 5B are detail views of a control device according to a second example of realisation in perspective and in partial section at the level of the interaction element.
Figure 5B:
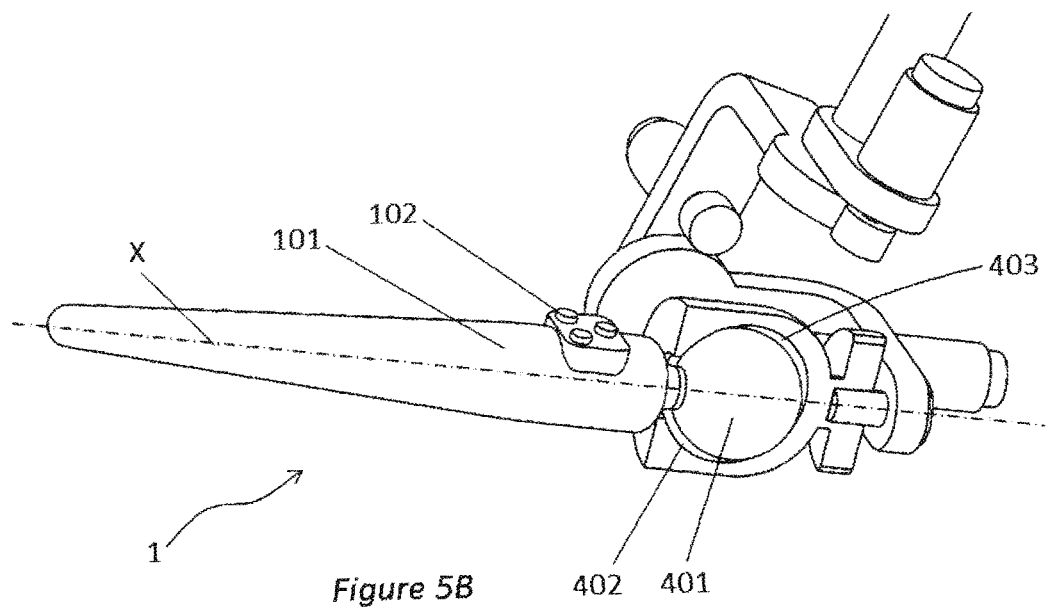

In FIGS. 5A and 5B may be seen a second example of realisation of a control device according to the first embodiment of the invention. This example differs from the first example in that the relative movement between the handle and the terminal body is limited in all directions (with the exception of rotation around the X axis in the example of FIGS. 5A and 5B).

The handle of FIGS. 5A and 5B still has a stylet shape and comprises a contact end of spherical shape 401 received in a cavity of corresponding spherical shape.

The contact area 402 is thus also spherical. The outer diameter of the sphere 401 and the inner diameter of the sphere 402 are chosen so as to enable relative movement between the handle and the terminal body in order to enable transparent operation in free space.

More particularly, the handle comprises a grab shaft 101 and a spherical contact end 401 connected to the shaft by a thinned area 103. The cavity 403 comprises an opening 209 of sufficiently large diameter for the passage of the thinned area 103 and sufficiently small to prevent the contact end 401 from escaping from the cavity 403 so as to form retaining means for the contact end 401.

The diameter of the spherical end 401 relative to the diameter of the cavity 403 is chosen according to the desired operation in free space. The more a large possibility of relative movement is desired between the contact end 401 and the contact area 402, the more the difference in diameter will be large and conversely, if a small possibility of relative movement is desired between the contact end 401 and the contact area 402, the difference in diameter will be small.

As for the device of FIGS. 3A and 3B, since the handle is revolving, the motor M6 and the sensor C6 may be omitted.

The operation of the second example of realisation of FIGS. 5A and 5B is similar to that of the control device of FIGS. 3A and 3B. It enables a multidirectional force feedback. Moreover, it enables, in a very advantageous manner relative to the first example of realisation, a bilateral force feedback in all translational directions since the contact end of the handle cannot escape from the cavity 403. The robot is then capable of applying a force feedback along the X axis in both senses, which the devices of FIGS. 3A and 3B and 4A and 4B do not enable.

This robot could be used to apply forces uniquely in translation. In this case the motors M4 to M6 will be used to orient the body 206 along the same orientation as the stylet 1. It could also be used to apply forces in translation and along up to two rotational degrees of freedom (taking into account its geometry, this robot cannot apply rotational forces around the X axis). In this case the motors M4 to M6 will be used to apply torques to the stylet 1 through contact forces on the one hand between the end 401 and the area 402 and on the other hand between the thinned area 103 and the opening 209.

Figure 6A:
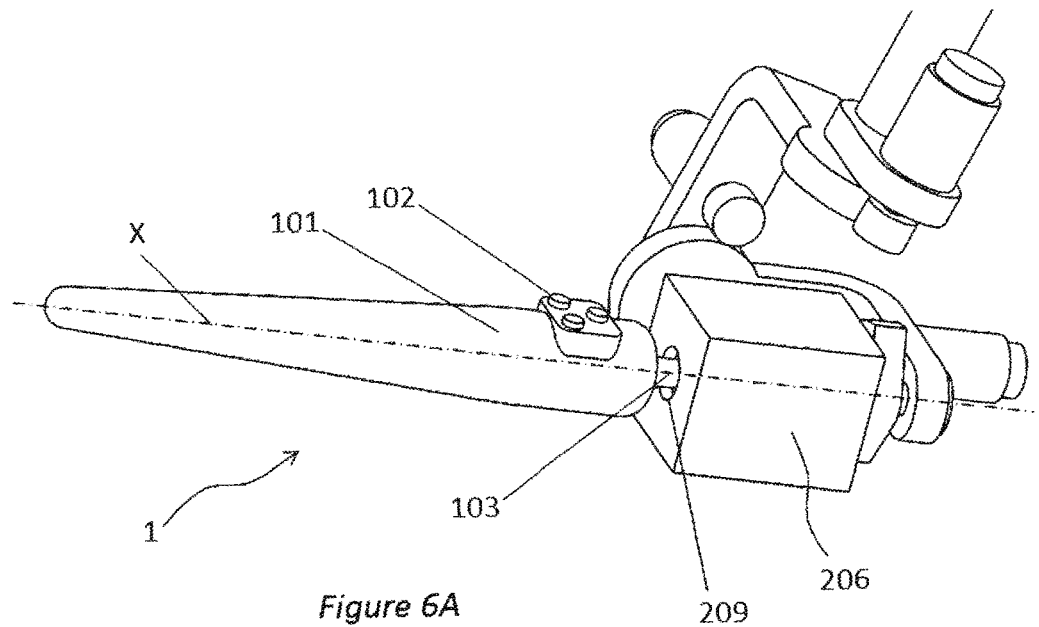
FIGS. 6A and 6B are detail and partial sectional views at the level of the interaction element of a variant of the device of FIGS. 5A and 5B, FIGS. 7A and 7B are partial sectional views of the interaction element of two variants of the device of FIGS. 6A and 6B, FIGS. 8A and 8B are detail perspective and partial sectional views at the level of the interaction element of another variant of the control device of FIGS. 6A and 6B, FIGS. 9A and 9B are detail perspective and partial sectional views at the level of the interaction element of a variant of the control device of FIGS. 8A and 8B.
Figure 6B:
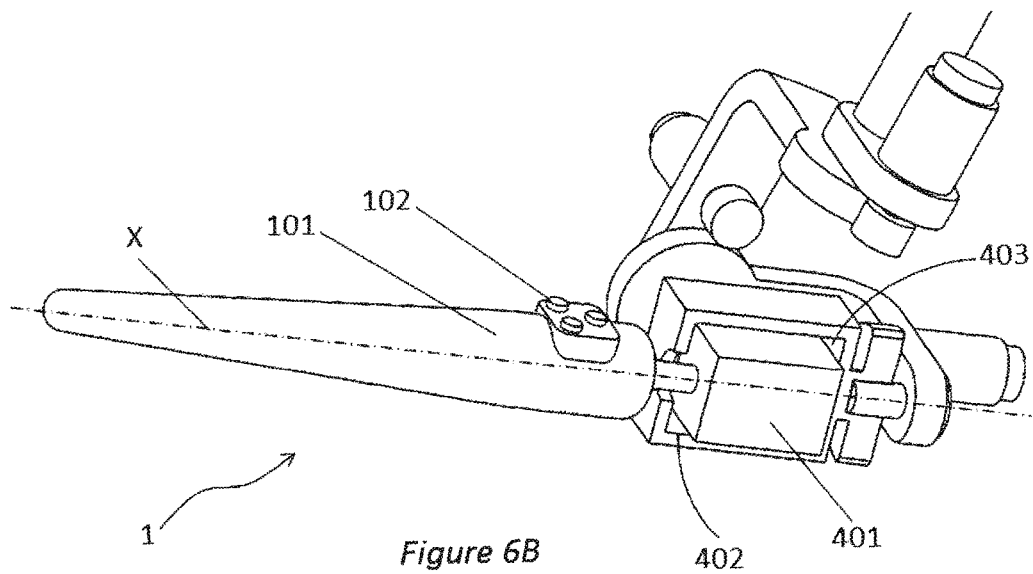

In FIGS. 6A and 6B may be seen a variant of realisation of the second example of realisation wherein the contact end 401 has a rectangular parallelepiped shape received in a cavity having a corresponding shape.

The shaft 101 of the handle is joined by a thinned portion 103 to one face of the contact end.

The operation is similar to that of the devices of FIGS. 3A to 5B. It has the advantage of offering a bilateral force feedback in all directions both in translation and in rotation. It makes it possible relative to the device of FIGS. 5A and 5B, once the contact end and the contact area are in contact, to apply a force to the hand of the user or to resist a force of the operator in all directions, both in translation and in rotation. The contact may take place on the faces, but it may also take place on a combination of edges or corners.

As previously, this robot could be used to apply forces uniquely in translation. In this case the motors M4 to M6 will be used to orient the body 206 along the same orientation as the stylet 1. It could also be used to apply forces in translation and along up to three rotational degrees of freedom. In this case the motors M4 to M6 will be used to apply torques to the stylet 1 through the contact forces between the end 401 and the area 402.

In FIG. 7A may be seen a variant of the device of FIGS. 6A and 6B, wherein it is the contact end 401 that encompasses the contact area 402. The terminal body 206 comprises a thinned area 210 connecting its upstream part to the contact area 402 and the cavity 403 comprises an opening 104 cut in the handle 1 of diameter sufficiently large for the passage of the thinned area 210 and sufficiently small to prevent the contact area 402 from escaping from the cavity 403. The operation of the device of FIG. 7A is similar to that of the device of FIGS. 6A and 6B.

Figure 7B:
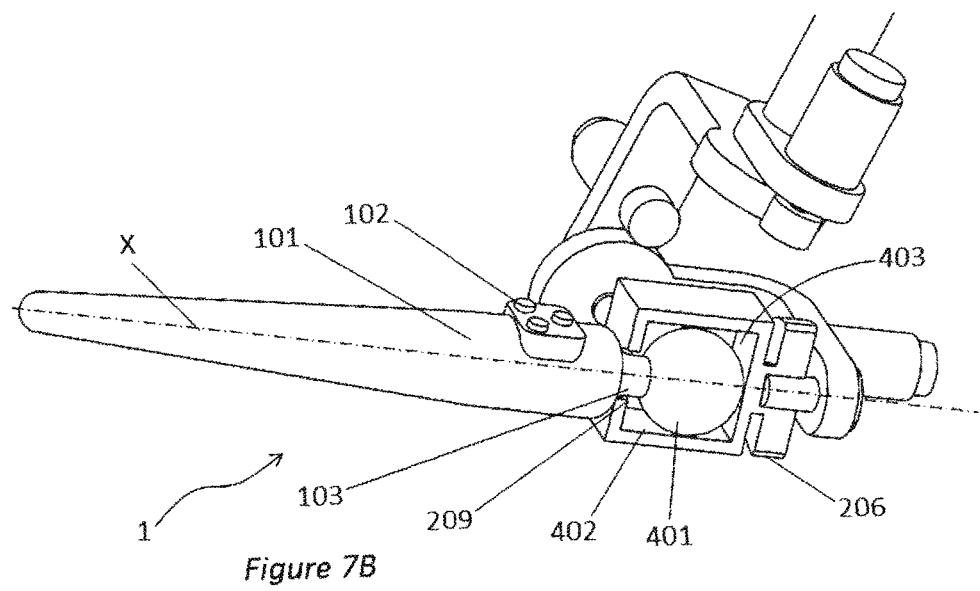

In FIG. 7B may be seen another variant of the second example of realisation of a control device according to the first embodiment of the invention combining certain elements of the device of FIGS. 5A and 5B and other elements of the device of FIGS. 6A and 6B, and wherein the contact end 401 has a spherical shape and the cavity 403 and the contact area 402 have a rectangular parallelepiped shape, advantageously cubic so that the behaviour of the system is the same in all directions. Thus, the contact of the sphere on each face of the cube will be occasional and easier to manage than on the device of FIGS. 6A and 6B.

Figure 8A:
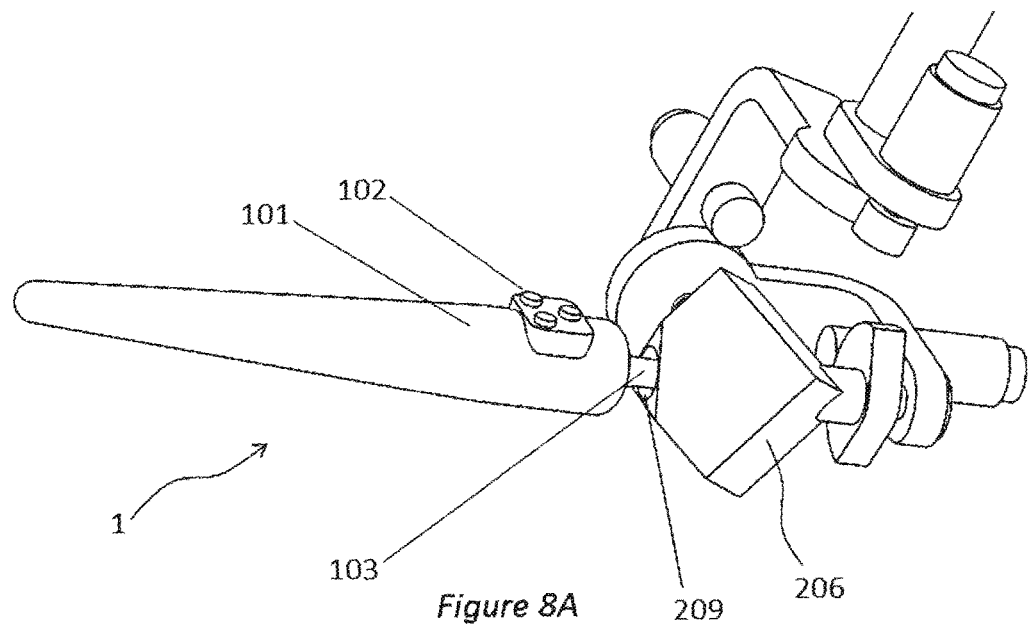
Figure 8B:
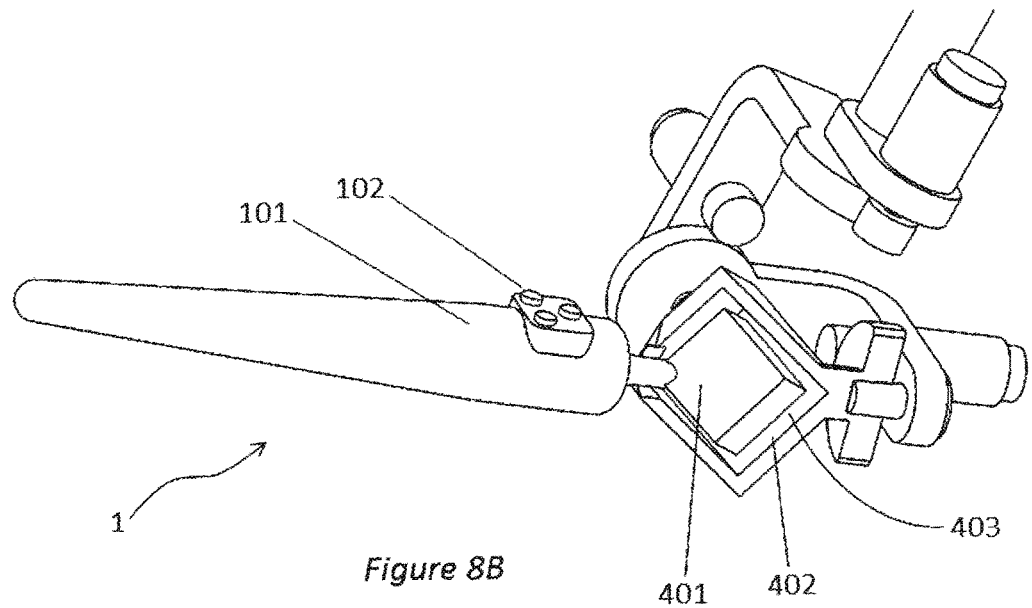

In FIGS. 8A and 8B may be seen another alternative to the device of FIGS. 6A and 6B, wherein the contact end 401 is of cubic shape, the cavity 403 has a corresponding cubic shape and the shaft is connected to the contact end by the thinned portion 103 at a corner of the cube.

The operation of this device is similar to that of the device of FIGS. 6A and 6B.

It will be understood that the shapes illustrated in FIGS. 3A to 8B are given as non-limiting examples and are represented in a stylised manner. Any other shape of the contact areas falls within the scope of the invention, on condition that the contact can be bilateral in at least one direction of space (in translation and/or in rotation). In the examples described in FIGS. 3A to 7A and 8A and 8B, the contact end and the contact area have corresponding shapes. It is also possible that the contact end and the contact area do not have corresponding shapes, as in the example of FIG. 7B.

Moreover, it will be understood that the contact end and the contact area may have different sizes or the same size, as for example in the variant of FIGS. 4A and 4B.

End and contact areas of identical size could also be provided on a part of their surface and operating in certain directions like the variant of FIGS. 4A and 4B and the ends and contact area of different sizes in other parts of their surface and operating in other directions like the other variants of the device.

Advantageously and as is the case for the devices of FIGS. 3A to 8B, the contact end and the contact area occupy an area which is positioned approximately around the intersection of the axes A4, A5 and A6. This arrangement has the advantage of being able to decouple easily the forces generated in translation and in rotation at the contact end and the contact area. It should be noted on the other hand that, in order to be able to apply for example a pure force on the grab area 101, it is necessary to apply on the contact end and the contact area both a force and a moment.

Figure 9A:
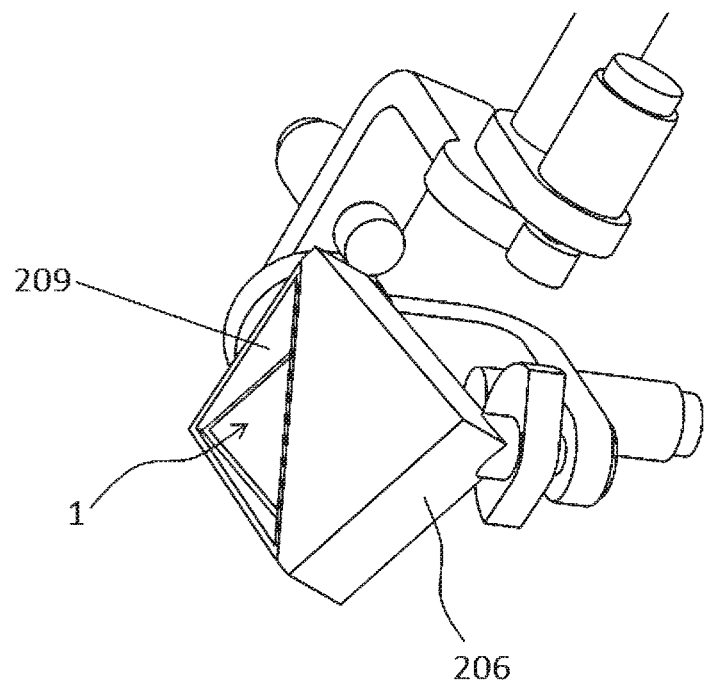
Figure 9B:
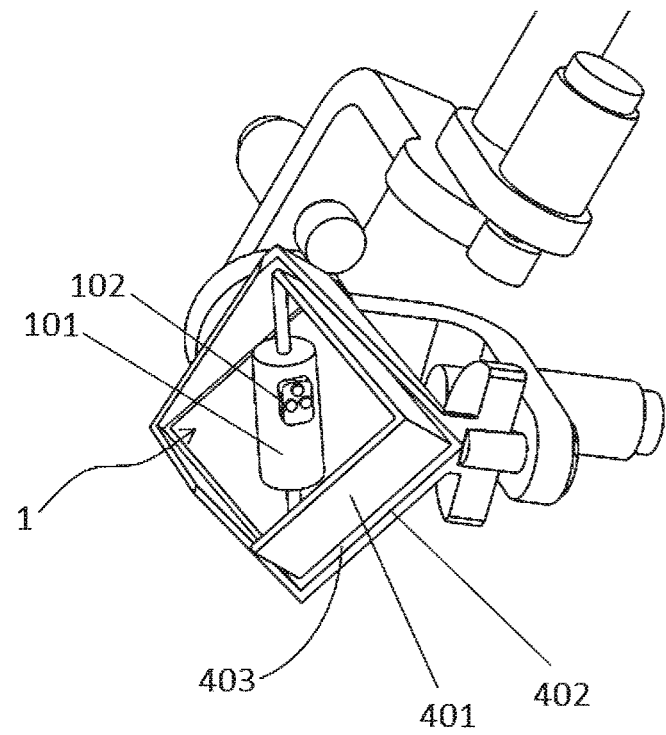

In FIGS. 9A and 9B may be seen yet another variant of realisation of the second example of realisation. The device of FIGS. 9A and 9B differs from those already described in that the handle is such that it is situated entirely inside the cavity 403. In the representation of FIGS. 9A and 9B, the terminal body 206 is represented as a single-piece element, but it will be understood that the terminal body could in practice be machined in several parts assembled around the contact end of the handle.

In this variant, the shaft or the grab area of the handle 1 is arranged such that its centre is located near to the intersection of the axes A4, A5 and A6. Thus the force feedback in translation and in rotation on the hand is decoupled.

In the example represented the contact end is cubic and is received in a cubic cavity. The shaft extends between two corners of the cube. Thus the contact end and the cavity comprise a sufficient opening to introduce therein one or more fingers, a hand or both hands and operate the handle. As in the devices described above, the shaft 101 may comprise control buttons 102.

It will be understood that this arrangement of the shaft of the handle inside the volume defined by the contact area may apply to all the variants of the first and second embodiments. For example, the contact area and the contact end could be spherical or then truncated sphere.

In the examples of devices described above and which comprise a robot such as that of FIG. 2, the axes A1 to A6 are motorised. In these conditions, it is possible to apply a force on the handle thus on the hand of the user or to oppose his movements in certain directions or all directions depending on the case, in translation and in rotation. This case thus involves a device having up to 6 degrees of freedom with force feedback. It could also be possible not to motorise the axes A4 to A6, In this case the device would have 3 degrees of freedom with translational force feedback, the rotations being free. The terminal body of the robot may then simply follow the rotational movements of the handle by being driving by it when the handle is in contact with the body 206. However, in the case of rotational change of direction, the user then feels the successive contacts of the surface 401 on each side of the surface 402, which can adversely affect the impression of moving in free space. In order to further improve the impression of movement in free space, a system with 6 degrees of freedom may be implemented and wherein the motors M4 to M6 are used to control the terminal body 206 such that its orientation follows that of the handle. It is then possible to motorise the axes A4, A5 and A6 with step-by-step motors such that the body 206 follows the movements of the handle. These motors have the advantages of being in general lighter, more compact and easier to control than torque controlled motors.

Figure 10:
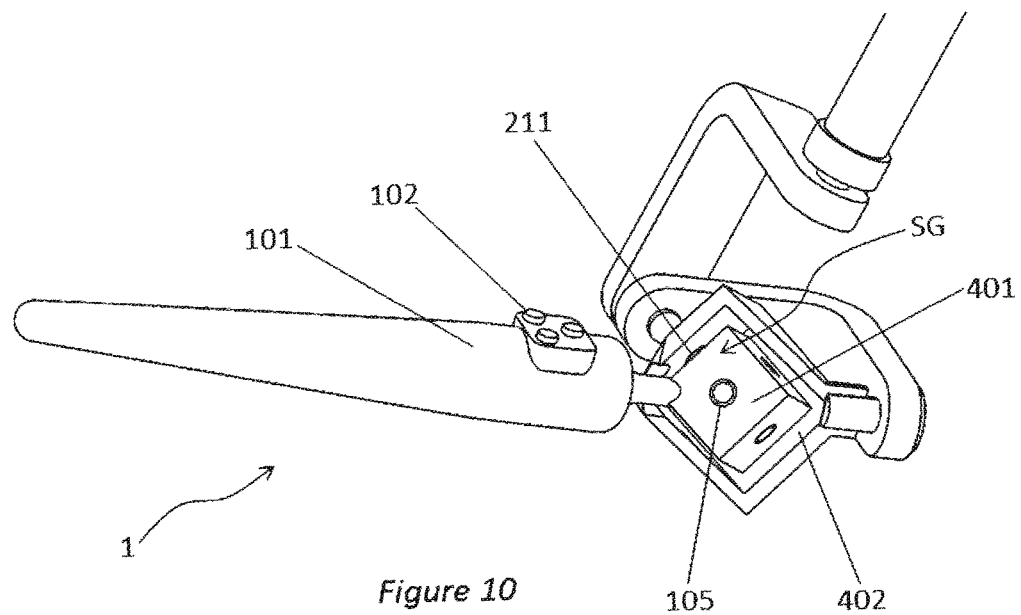
FIG. 10 is a partial sectional view of a variant of the device of FIGS. 8A and 8B comprising means for alignment of the handle and the terminal body.

In a variant and as is represented in FIG. 10, passive systems may be provided to align automatically the handle and the terminal body of the robot in orientation.

In the example represented, the guiding system SG comprises one or more magnets 105 on the contact end 401, of which a pole, for example the north pole, is situated facing the contact area 402 and one or more magnets 211 on the contact area 402, of which the pole is that of the pole of the magnets 105 of the facing contact area, here for example the south pole, is situated facing the contact end 401. Thus the poles of the magnets 105, 211 are going to attract each other and automatically align the contact end 401 and the contact area 402, and thus are going to align the handle and the terminal body of the robot.

The magnets 105, 211 are advantageously placed in housings machined in hollows in the parts 1 and 206 such that they do not protrude beyond the surfaces of the contact areas 401 and 402 and that they do not hinder the placing in contact of these areas.

In a variant, the magnets 105, 211 could be situated on the handle 1 and on the body 206 outside of the contact end 401 and the contact area 402. For example the cavity may comprise on the side of its opening magnets and the handle could comprise an element extending radially facing the side of the opening of the cavity and bearing magnets.

The magnets of the terminal body and/or the handle could be replaced by electromagnets, which would make it possible to drive the alignment, for example as a function of the distance between the contact end 401 and the contact area 402. Furthermore, although the axes A4, A5 and A6 are not motorised in this case, they could be equipped with position sensors to know the orientation of the terminal body.

This embodiment of a self-alignment system is given for indicative purposes and is not limiting. It could thus be possible to use a different number of magnets or electromagnets on the contact end 401 and on the contact area 402. These magnets or electromagnets could further be arranged differently and not necessarily facing each other. Any other device fulfilling the same function could further be used. For example it may be thought to insert between the contact end 401 and the contact area 402 a very flexible foam having practically no resistance when these surfaces come into contact but making it possible all the same to push the body 206 in free space. It will be understood that these solutions could apply to all the embodiments and to all the variants of realisation.

Figure 11:
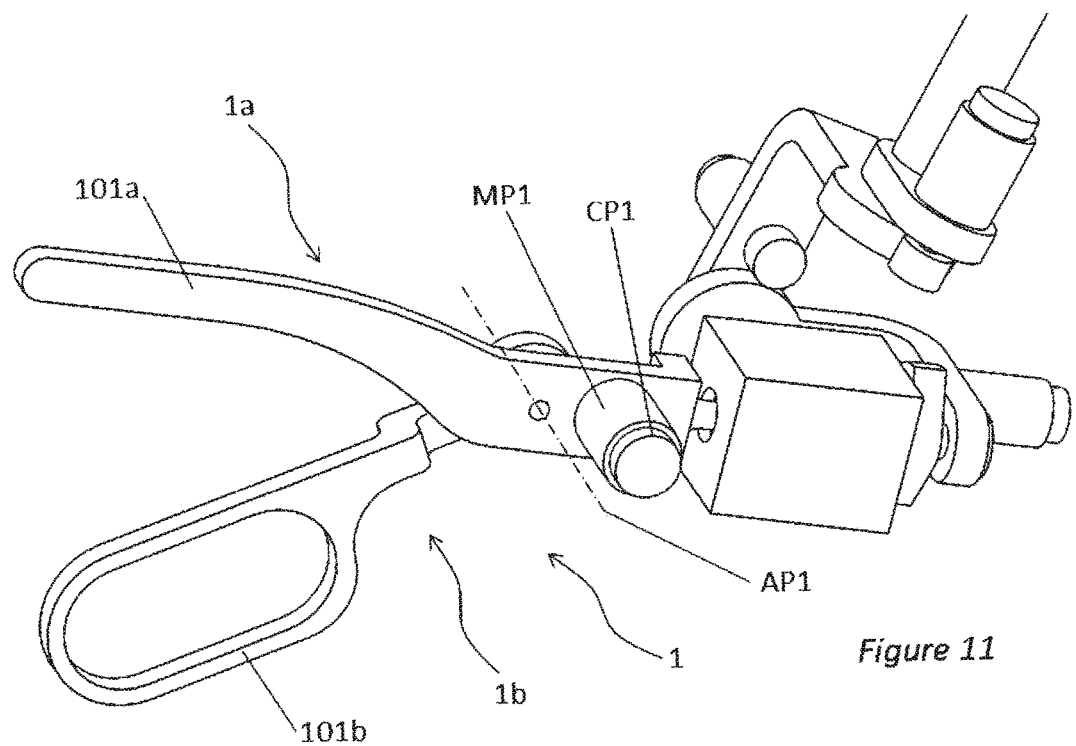
FIG. 11 is a perspective view of a variant of realisation of FIGS. 6A and 6B wherein the handle comprises two elements rotationally articulated with respect to each other.

In FIG. 11 may be seen a variant of realisation of the shape of the handle. This variant is applied to the device of FIGS. 6A and 6B, but it will be understood that it can apply to all the devices. This variant forms a clamp with force feedback.

The shaft has been replaced by two bodies 1a and 1b rotationally movable around the axis AP1. Each of the bodies 1a and 1b comprises a grab area, designated respectively 101a and 101b. The body 1a is provided with a contact end (not visible) housed in a cavity and being able to come into contact with a contact area (not visible). The additional degree of freedom around the axis AP1 may advantageously be motorised using a motor MP1 provided with a position sensor CP1, which may each be of all the types described above.

Alternatively the two bodes 1a and 1b could be translationally mounted with respect to each other.

It will be noted that for this variant, the motor and the encoder may be connected to the controller via electrical jumper cables or cables making their way along the robot. The handle may also be advantageously equipped with a rechargeable battery or cells to supply the motor MP1 and a card equipped with a wireless transmission to receive the orders of the controller and to send back to it the information items of the position sensor. This variant of the handle may be used in all the examples of devices described.

It will be understood that it could also be possible to equip each of the bodies 1a and 1b with a contact end, each of them facing a contact area, without going beyond the scope of the invention. In this case it would not be necessary to motorise the handle 1 and the motor MP1 and the encoder CP1 could be omitted. The contact areas could be positioned on the end bodies of two different robots or instead on the end bodies of a single tree-structured robot.

It will also be understood that the pen or scissor shapes of the handle 1 are only given as examples. The handle 1 could also without going beyond the scope of the invention take any other shape suited to ergonomic grabbing and handling. It may for example and in a non-limiting manner have the shape of a power take-off handle, a joystick handle, a T, a ball, a mouse, a knob, a steering wheel or a lever. It may also have a hollow shape, deformable or not, such as for example a die or a ring in which it is possible to insert one or more fingers or the palm or the whole hand. It may also be deformable such as for example a clamp with two legs. It will be understood that these solutions could apply to all the embodiments and to all the variants of realisation.

The means for measuring the configuration of the handle, also called tracking system, will now be described.

The aim of the tracking system is to measure either the absolute configuration of the handle in space, or the relative configuration of the handle 1 relative to the robot 2 and, in particular, relative to the terminal body 206. This tracking system, in the case where it measures the absolute configuration of the handle, can also measure the absolute configuration of the terminal body 206 of the robot, configuration known furthermore thanks to the sensors of C1 to C6 of the robot. These information items (absolute configuration of the handle and the robot in space and relative configuration of the handle relative to the robot) are used by the controller for the coupling of the master arm, the haptic interface or the cobot integrating a device according to the present invention to a slave arm or a simulation in virtual reality or instead for the management of power assistance modes.

Figure 12:
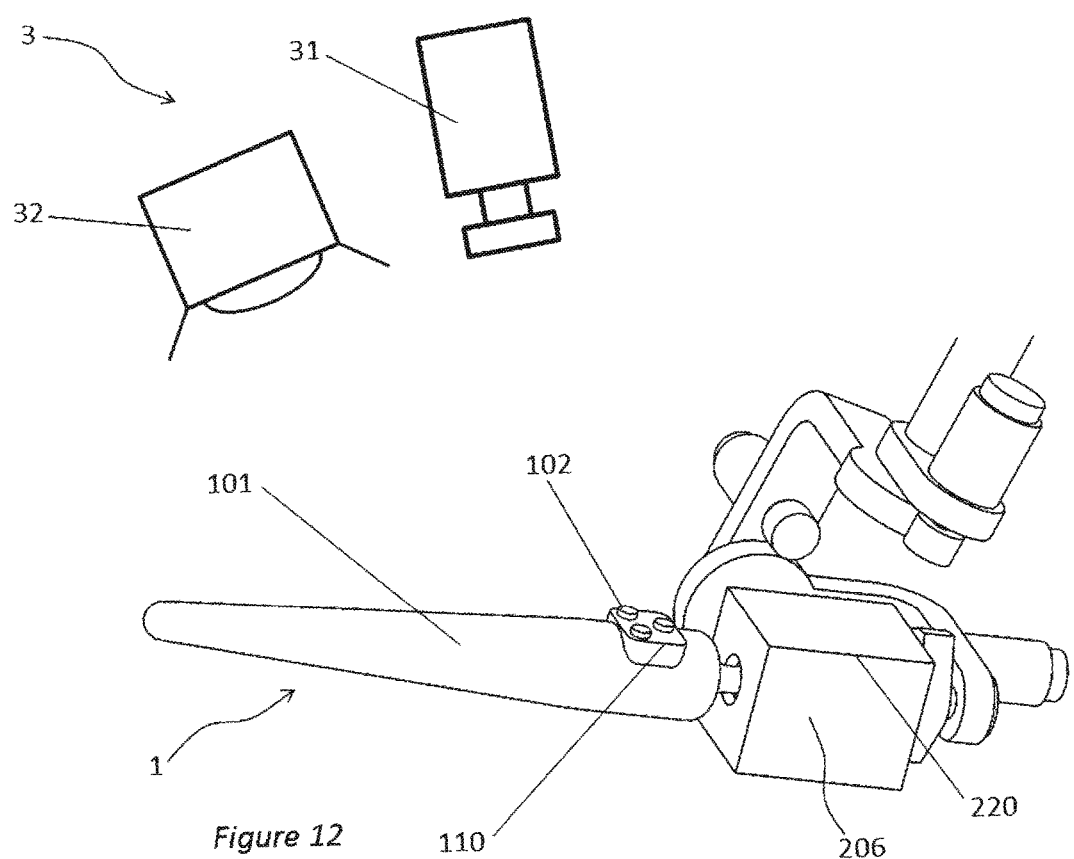
FIG. 12 is a perspective view of a control device of FIGS. 6A and 6B comprising a tracking system according to a first example of realisation.

In FIG. 12 may be seen a first embodiment of the tracking system which can be implemented in the present invention represented schematically, the system being qualified as "external".

The system comprises a camera 31 arranged so as to visualise the handle and the terminal body. The camera may operate in any band of the light spectrum, in particular in the visible light or in the infrared domain. The image obtained by this camera is processed to extract therefrom the information items of position and orientation of the handle. This camera may also advantageously be used to measure at the same time the position and the orientation of the terminal body 206 of the robot. This system has the advantage of not requiring any additional equipment on the handle and on the robot.

It may advantageously be provided that the handle and the terminal body 206 comprise sharp edges 110, 220 which are easier to use by image processing algorithms than rounded shapes. These edges are for example produced by machining.

Preferably, the camera is associated with a lighting device 32 to reinforce the contrast of the image in the measurement spectrum of the camera, the lighting delivered by the lighting device being for example infrared. This lighting device may be separate from the camera as illustrated in FIG. 12 or incorporated around the objective.

The handle and the body 206 may advantageously be illuminated with the aid of light structured to facilitate the measurements.

It may be provided to implement several cameras and/or lighting devices arranged around the robot and the handle, to carry out 3D measurements, to have better resolution and/or instead to avoid dead angles and visual occlusions.

The images thereby obtained are processed by imaging techniques and associated image processing algorithms well known to those skilled in the art and which will not be detailed herein.

Figure 13:
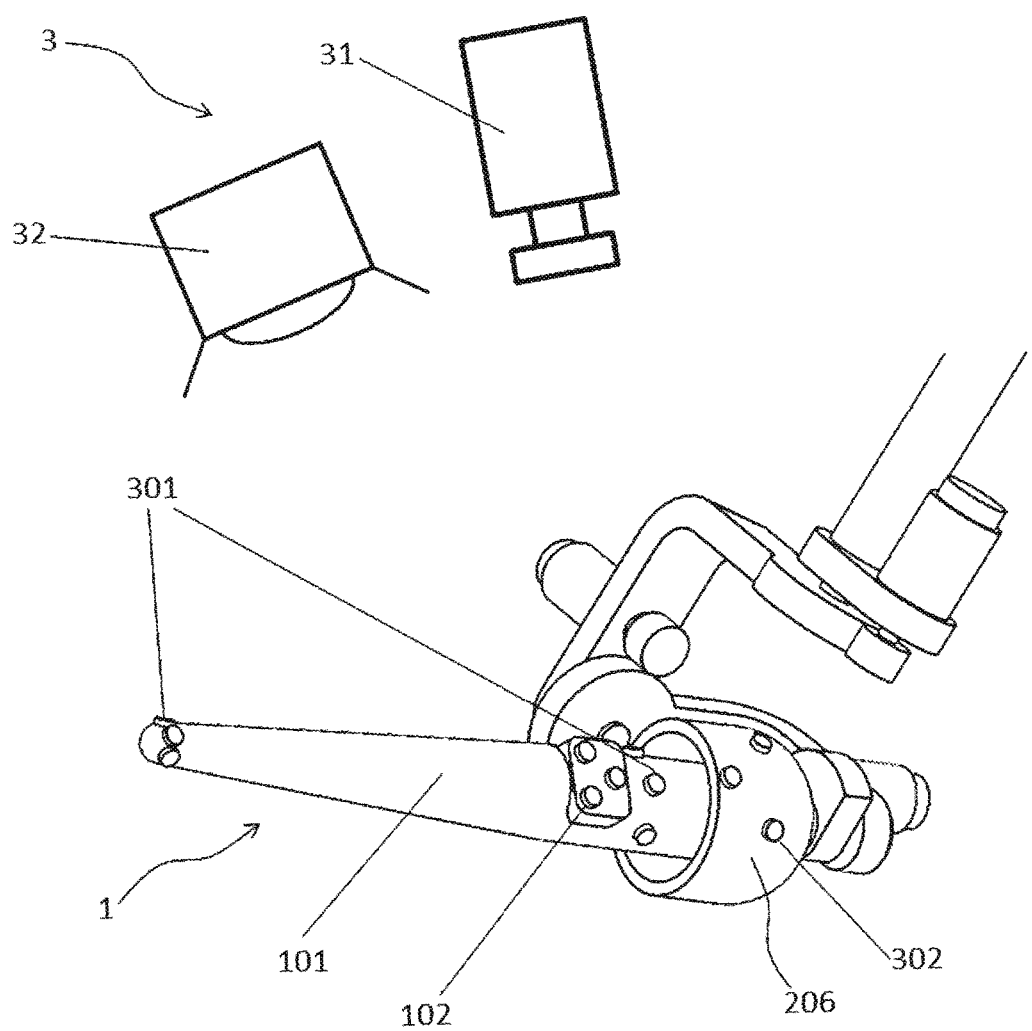
FIG. 13 is a schematic perspective view of the control device of FIGS. 3A and 3B comprising a variant of the tracking system of FIG. 12.

In FIG. 13 may be seen a variant of realisation of the system of FIG. 12, in which the targets 301 and 302 are incorporated in the handle 1 and in the terminal body 206 of the robot. These targets may be passive, they are then advantageously retro-reflective in the spectrum of the lighting device 32. Alternatively, they may be active, ensuring their own lighting, for example in the infrared domain. Such active targets may advantageously be driven to each send a specific signal, for example at a given frequency, so as to facilitate their pinpointing and their distinction relative to the other targets.

In the case where active targets are provided on the handle, the handle may advantageously comprise batteries or cells necessary for electrical supply. Such targets are easier to pinpoint and facilitate the measurement of the configuration of the system. It is clearly understood that targets could only be incorporated on the handle or on the body 206. Several cameras could further be used here to carry out the measurements.

It may also be provided to use passive targets and active targets, for example passive targets on the handle thus not requiring any supply and active targets on the robot.

Furthermore the targets may have different shapes and sizes to help them to be distinguished, notably in the case of passive targets. Such targets may further be of different colours, or comprise geometric patterns making it possible to distinguish them more easily.

Thanks to the tracking systems as shown schematically in FIGS. 12 and 13, the absolute positions and orientations of the handle and the terminal body of the robot are obtained, from which the relative configuration of the handle relative to the robot may be deduced easily. It is recalled that the absolute positions and orientations of the terminal body of the robot may also be obtained thanks to the sensors of the robot. It is thus not necessarily useful to measure them with the tracking system 3 and only the configuration of the handle can be measured which will be the only one to be lit or provided with targets.

The tracking systems illustrated by FIGS. 12 and 13 are only given as examples. Generally speaking, any contactless measurement system could be used such as for example and in a non-exhaustive manner: motion capture systems with or without targets such as ART Track or Vicon Bonita devices, electromagnetic or ultrasonic sensors such as Polhemus sensors, laser trackers of the Leica Eye Tracker type, field of view or time of light cameras such as Kinect® systems or the Leap Motion® device.

Figure 14:
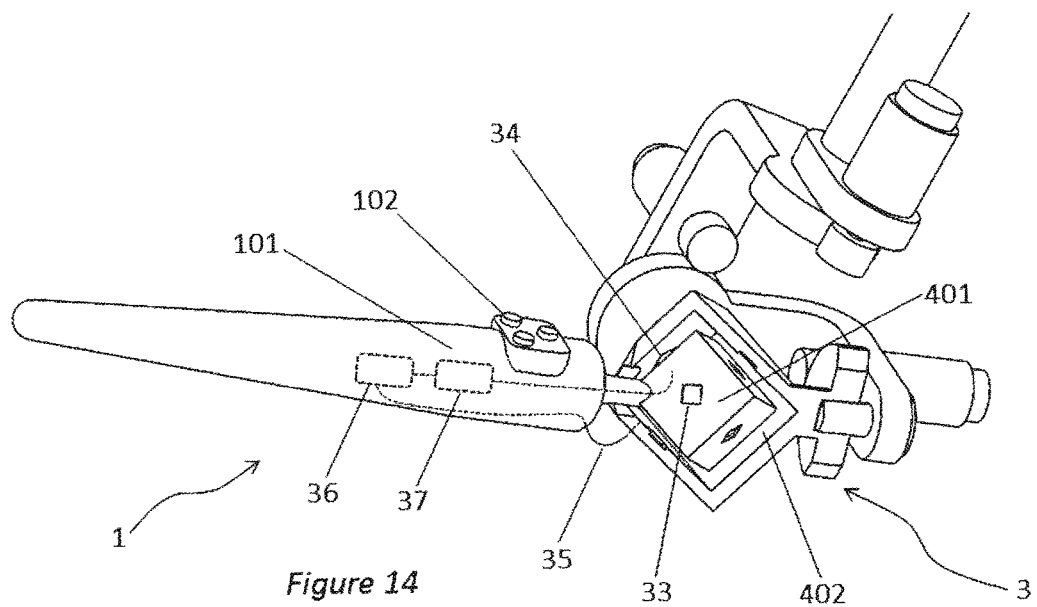
FIG. 14 is a schematic perspective view of the control device of FIGS. 8A and 8B comprising a second example of tracking system.

In FIG. 14 may be seen schematically represented a second embodiment of a tracking system suited to the present invention. This is qualified as "internal tracking system".

In this embodiment, the handle 1 and the terminal body 206 of the robot incorporate contactless sensors making it possible to know the relative configuration of the handle relative to the robot. Since the absolute configuration of the terminal body of the robot is known with the help of a geometric model using as input the values of the sensors of the robot, the absolute configuration of the handle is easily deduced therefrom.

In the representation of FIG. 14, the handle is equipped at the level of the contact area 401 with emitters 33 which may be for example light emitting diodes (LEDs) emitting in the infrared domain and supplied by cells or batteries advantageously incorporated in the handle. These LEDs are advantageously spread out regularly on the perimeter of the contact end 401. In the embodiment represented wherein the contact end is cubic, a LED is provided on each of the faces. In a variant, several LEDs could be provided per face or further certain faces could not be equipped with LEDs, these being concentrated on certain parts only of the contact end 401. The contact area 402 is for its part equipped, facing the LEDs 33, with sensors 34 sensitive to the distance to the LEDs and/or to changes of orientation of the facing LEDs, for example phototransistors. In the example represented, they are six in number (of which certain are not visible) each arranged on one of the faces of the area 402. The number of sensors 34 and their arrangement depend on the number of LEDs and their distribution on the contact end.

Preferably, the LEDs 33 and the sensors 34 are advantageously incorporated in hollows machined in the contact end 401 and the contact area 402 so as not to be projecting from their surface and not hinder the phase of movement in free space and the placing in contact of these surfaces. The combination of the measurements of the different LED—sensor pairs makes it possible to calculate the relative configuration of the handle relative to the terminal body 206. It will be understood that the sensors 34 could conversely be positioned on the handle and the LEDs 33 on the terminal body 206. It could further be possible to have certain sensors on the handle and others on the body 206 and certain LEDs on the handle and others on the body 206.

In a variant, the phototransistors 34 could be replaced by linear or surface PSD (Position Sensitive Detector) movement sensors. It will be understood that there could be a different number of LEDs and sensors, certain sensors such as surface PSDs, well known to those skilled in the art and of which the operation will not be detailed herein, being able to measure movements along several directions.

Also in a variant, proximeters could be used instead of the LED-phototransistor assemblies. These components incorporate on a same component an emitter and a receiver and directly supply information on the distance of the facing object, without it being necessary to fix thereon a target. In this case these proximeters could all be arranged on the handle, all on the body 206 or be distributed between the handle and the body 206.

According to another variant, coils through which a current flows could further be placed on the handle and on the body 206 and in which the mutual inductance varies as a function of their distance, certain coils further being able to be replaced by permanent magnets. In this case the magnets would advantageously be placed on the handle and the coils on the body 206.

According to another variant, conductive surfaces could be used on parts facing the areas 401 and 402 so as to create a capacitor of which the capacitance varies as a function of the distance that it is sought to measure.

Generally speaking, the tracking system could implement all types of contactless sensors making it possible to estimate the distance or closeness of an area of the handle relative to the terminal body of the robot, using for example and in a non-exhaustive manner electromagnetic, ultrasonic or optical technologies, operating with or without target, in particular inductive or capacitive sensors or infrared proximeters. It could also implement passive mechanical measurement systems between the handle 1 and the body 206 such as miniature replica masters having suitable mobilities or deformable structures having sensors in sufficient number. These devices are known and will not be detailed herein. In this case nevertheless the transparency in free space would be reduced relative to a contactless system.

It will be understood that a tracking system combining several types of sensor does not go beyond the scope of the present invention, for example accelerometers and optical sensors. Moreover, whatever the sensors retained, the number of sensors implemented depends on the number of degrees of freedom of the system and the number of measurements that each sensor can supply. In order to improve the quality of the measurements, the number of sensors implemented may be greater than that strictly required.

Figure 15:
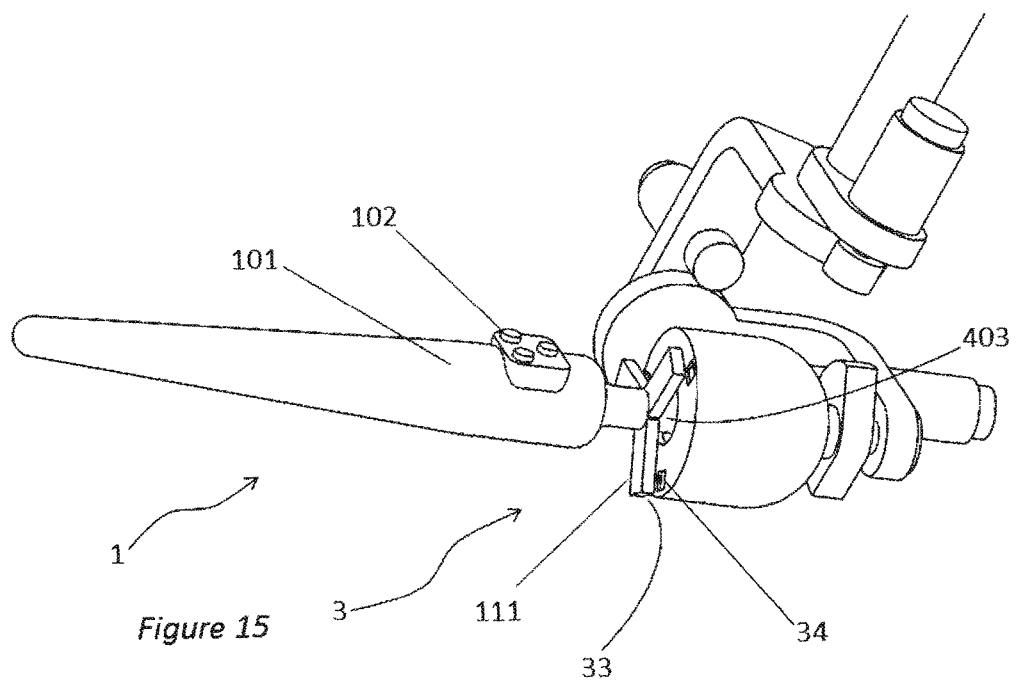
FIG. 15 is a schematic perspective view of the control device of FIGS. 5A and 5B comprising a variant of the tracking system of FIG. 14.

In FIG. 15 may be seen a variant of the tracking system of FIG. 14. In this variant, the measurement devices 33-34 are arranged outside of the contact end 401 and the contact area 402, which simplifies the realisation of the device. For example, the handle comprises elements 111 extending transversally relative to the longitudinal axis, and bearing LEDs 33 arranged facing the contour of the opening of the cavity 403. Surface sensors PSD 34 are provided on the contour of the opening of the cavity facing the LEDs. The elements 111 extending transversally are formed in the example represented of three arms spread out angularly in a regular manner around the axis of the shaft. These components are only given as examples and any other measurement means such as those presented above could be used. It could also be possible to use more measurement systems or lay them out differently on the handle and on the body 206.

The tracking systems described above apply to all the control devices described.

It may be provided that the handle and/or the body 206 are equipped with means for detecting contact between them. It is possible for example and as is illustrated by FIG. 14 to use an electric circuit composed of a flexible wire 35, a battery or a cell 36, a current sensor 37 and contact area and end 401 and 402 which will be advantageously covered with a thin layer of conductive material. The wire 35 circulates from the conductive material of the contact end 401 to the conductive material of the contact area 402 via the elements 36 and 37 (it is represented in dotted lines in the places where it passes inside the handle and the body 206). Thus when the surfaces 401 and 402 are separated, the circuit is open and no current flows in the sensor 37. Conversely, when these surfaces are in contact, current flows and is detected by the sensor 37. This contact information may then be used by the controller.

This very simple device is given as an example. Any other means for checking contact could be used, for example contactors, switches or pressure or force sensors arranged on the handle and/or the body 206. In a variant, these contact detection means may be an ancillary optical, magnetic or electromagnetic system, one or more contact or force sensors such as strain gauges or a piezoelectric material, one or more sensors of movement and/or deformation of a mechanical part, etc.

A second embodiment of the invention will now be described wherein means for temporarily securing the handle on the main body are provided.

Figure 16:
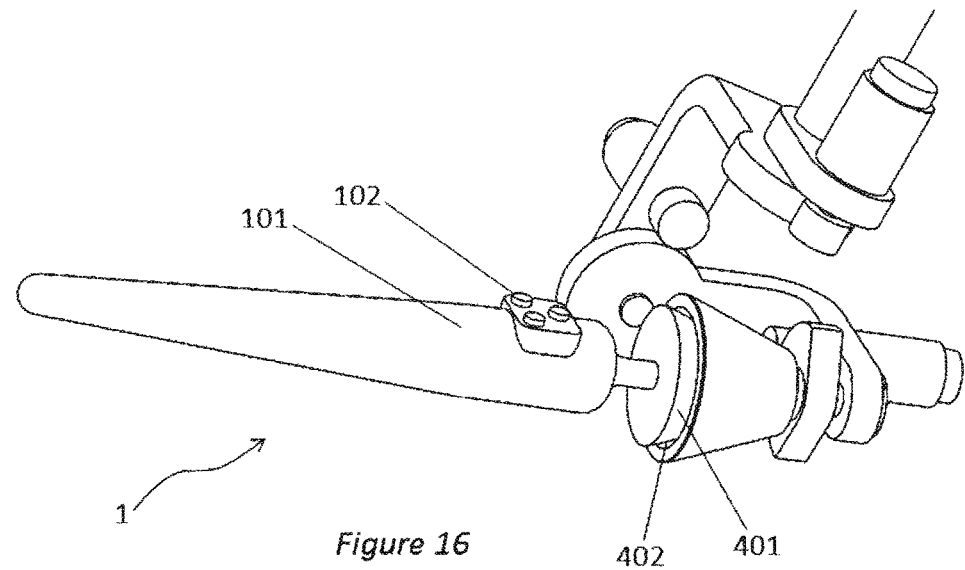
FIG. 16 is a perspective view of a control device according to a second embodiment comprising temporary securing means.

In FIG. 16 may be seen a first example of this second embodiment which is close to the example of the first embodiment represented in FIGS. 4A and 4B. The contact end 401 has a truncated cone shape and the cavity 403 of which the inner surface forms the contact area 402 also has a truncated cone shape. However in this example of realisation, the angles at the top of the cones defining the outer surface of the contact end and the inner surface of the contact area are such that once placed in contact, it is necessary to apply a certain force to disconnect them. The slope of the cone, the pairing of materials and the surface state of the areas 401 and 402 could advantageously be chosen such that the separation of the two parts requires a given known force. Thus below this force the handle could be considered as secured to the robot and forces could be transmitted to it in all directions, both in translation and in rotation.

Figure 17:
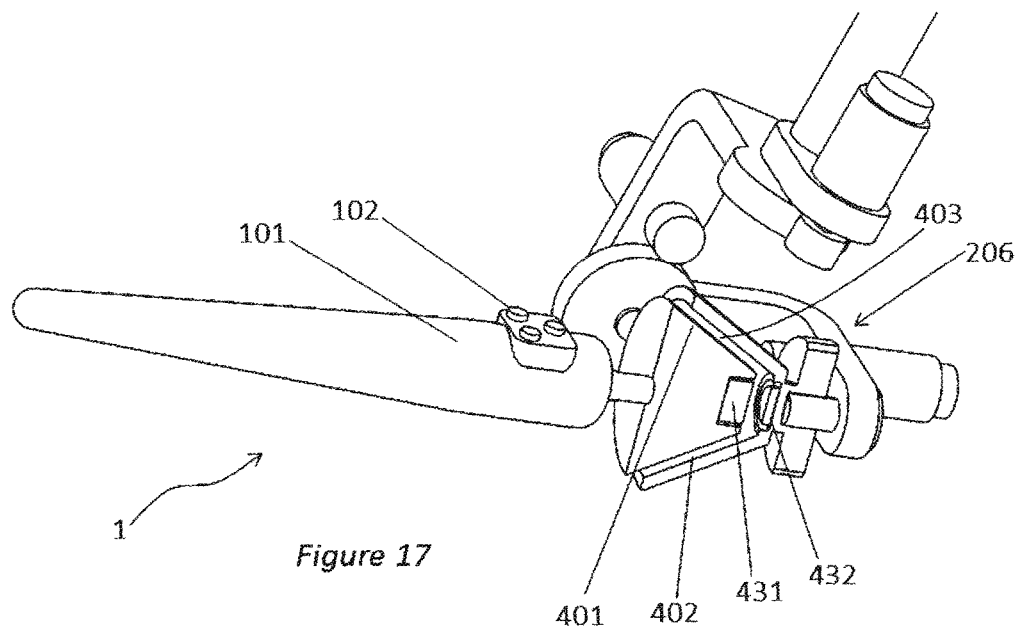
FIG. 17 is a perspective view of a control device according to the second embodiment comprising another example of temporary securing means.

In FIG. 17 may be seen a variant of realisation of the second embodiment. In this variant, the securing of the handle and the terminal body is not obtained by jamming of two truncated cone surfaces but by means of a securing device incorporated on the handle and on the body 206, this securing device being a threshold or controllable device and comprising the elements 431 and 432. The element 432 situated in the bottom of the cavity 403 may for example be a magnet and the element 431 situated at the free end of the contact end 401 may comprise at least one part made of a metallic material. Thus when the contact end 401 and the contact area 402 approach each other, the elements 431 and 432 are going to attract each other and secure together the handle and the body 206 as long as opposing forces sufficient to detach the magnet 432 and the part 431 are not exerted on them. In an alternative, the magnet could be situated on the handle and the magnetic material on the body 206. Two magnets of which the opposite poles are facing each other could further be used. This securing device is a threshold device. In the case where this threshold phenomenon would not be desired, it is advantageously possible to implement a controllable system with two states. A system including a magnet 431 advantageously placed on the handle and a coil 432 placed on the body 206 could for example be used, so as to be able to be supplied easily. Thus if no current flows in the coil, the handle and the body 206 are free to detach whereas if a current flows in the coil, the handle and the body 206 are maintained in contact by a force generated by the interaction between the magnetic fields of the magnet and the coil.

In a variant, a magnetic suction pad device could be used. Such devices are known to those skilled in the art and will not be detailed herein. In a further variant, a controllable securing device as described in the document US2011073118 could be implemented in the present application.

Figure 18:
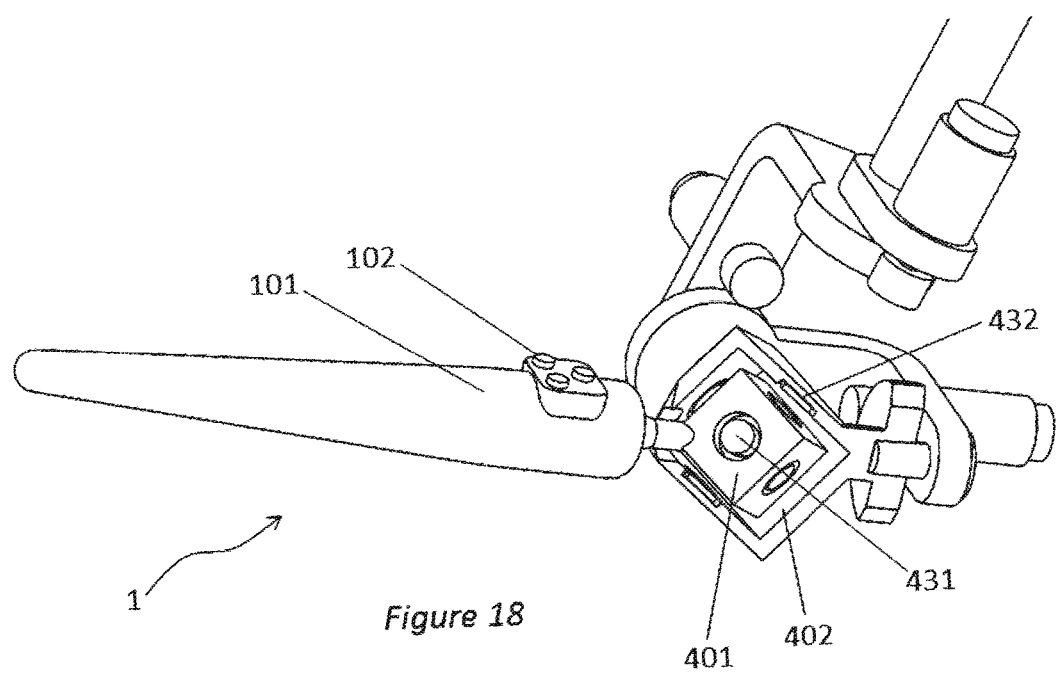
FIG. 18 is a perspective view of a control device according to the second embodiment comprising another example of temporary securing means.

FIG. 18 illustrates a second variant of the second embodiment of the device. In this variant, the contact end and the contact area are parallelepiped and several securing devices 431 and 432 are incorporated on the perimeter of their surface. Thus it will be possible to secure the handle 1 and the robot 2 whatever the portion of the areas 401 and 402 in contact. It will be understood that all the types of securing device described above may be applied.

In a non-exhaustive manner, the following securing device solutions may be implemented: one of the surfaces could be smooth, the other equipped with suction pads or pneumatic low pressure systems, the two surfaces could also be provided with Velcro® strips, or at least one of them be coated with an adhesive or an adherent polymer.

During the operation of a device according to the present invention comprising a driven securing device the information of the distance of the avatar, the slave robot or the cobot to its environment is used to control the securing device, so as to secure together the handle and the robot at the moment where the avatar, the slave robot or the cobot come into contact with their environment.

Examples of robots that can be implemented in the control device according to the invention will now be described.

Figure 19:
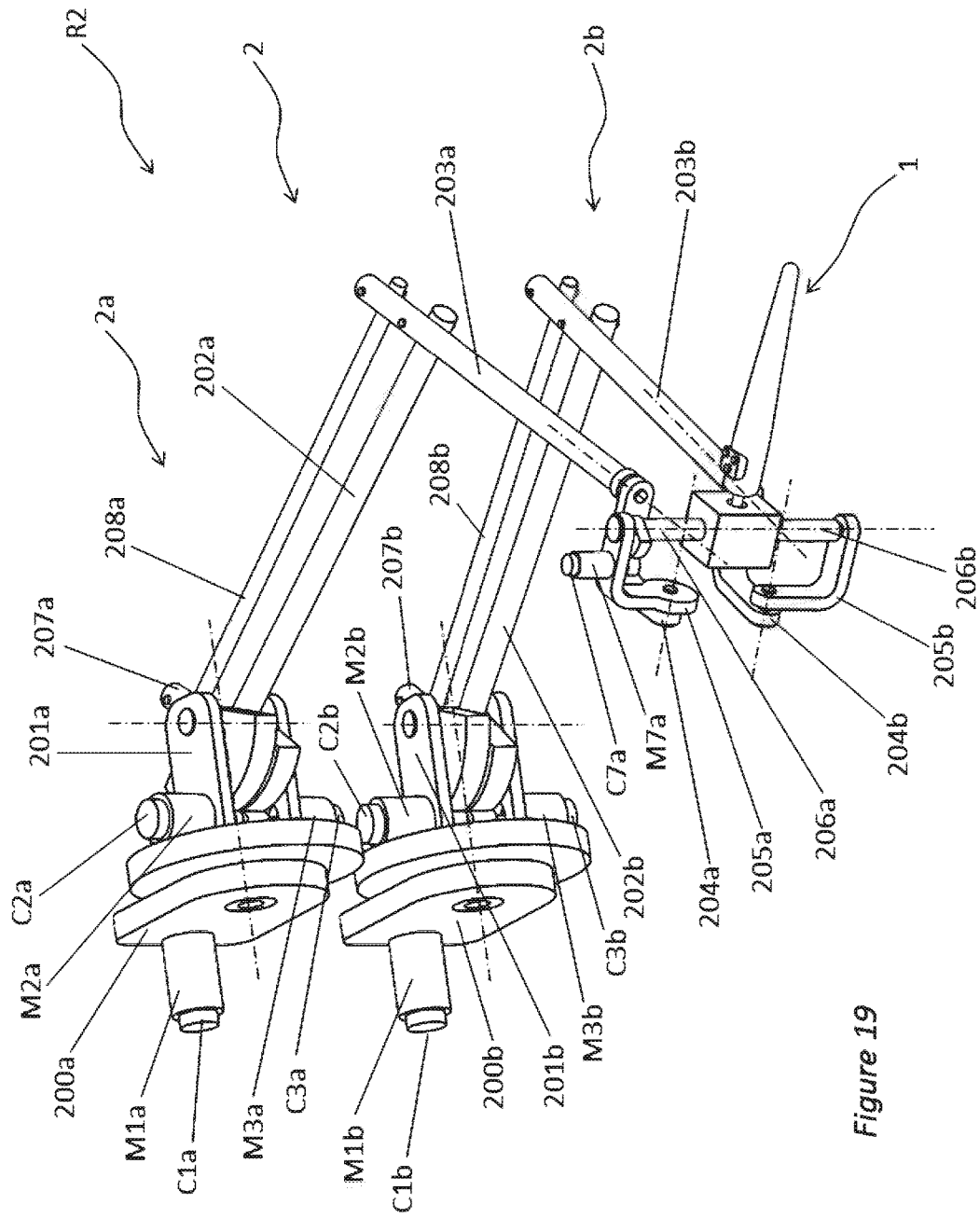
FIG. 19 is a perspective view of a control device comprising a hybrid robot with 6 degrees of freedom.

In FIG. 19 may be seen a hybrid robot with 6 degrees of freedom comprising end bodies bearing a contact area cooperating with a handle according to the invention.

The robot R2 comprises two legs 2a and 2b including respectively the bodies 200a to 208a for the leg 2a and 200b to 208b for the leg 2b. Each leg has a structure similar to the robots described previously, except that it only comprises 4 motors for the leg 2a and 3 motors for the leg 2b, but it could also have a different structure. The legs 2a and 2b are arranged in parallel and connected at the level of their terminal organs 206a and 206b. The body 206a is rotationally movable relative to the body 205a, the body 206b is rotationally movable relative to the body 205b and the body 206a is rotationally movable relative to the body 206b. The axes of these links are advantageously collinear. In the example represented, the contact area 402 is situated on the body 206a. In a variant, it could be situated on the body 206b if it was the leg 2b which was equipped with 4 motors and the leg 2a which was only equipped with 3 motors. The contact area as well as the handle 1 are here similar to those of FIGS. 6A and 6B.

The leg 2a is equipped with motors M1a to M3a provided with position sensors C1a to C3a. The leg 2b is equipped with motors M1b to M3b provided with position sensors C1b to C3b. By making it possible to move the ends of the two legs and/or to apply a force to these ends in the same direction, these motors make it possible to ensure a force feedback on 3 translational degrees of freedom. By making it possible to move the ends of the two legs and/or to apply a force to these ends in opposite directions, they make it possible to ensure a force feedback on 2 degrees of freedom in rotation around axes perpendicular to the bodies 206a and 206b. An additional motor M7a equipped with a sensor C7A is arranged on the body 205a and ensures the force feedback around the axis of the bodies 206a and 206b.

Figure 20:
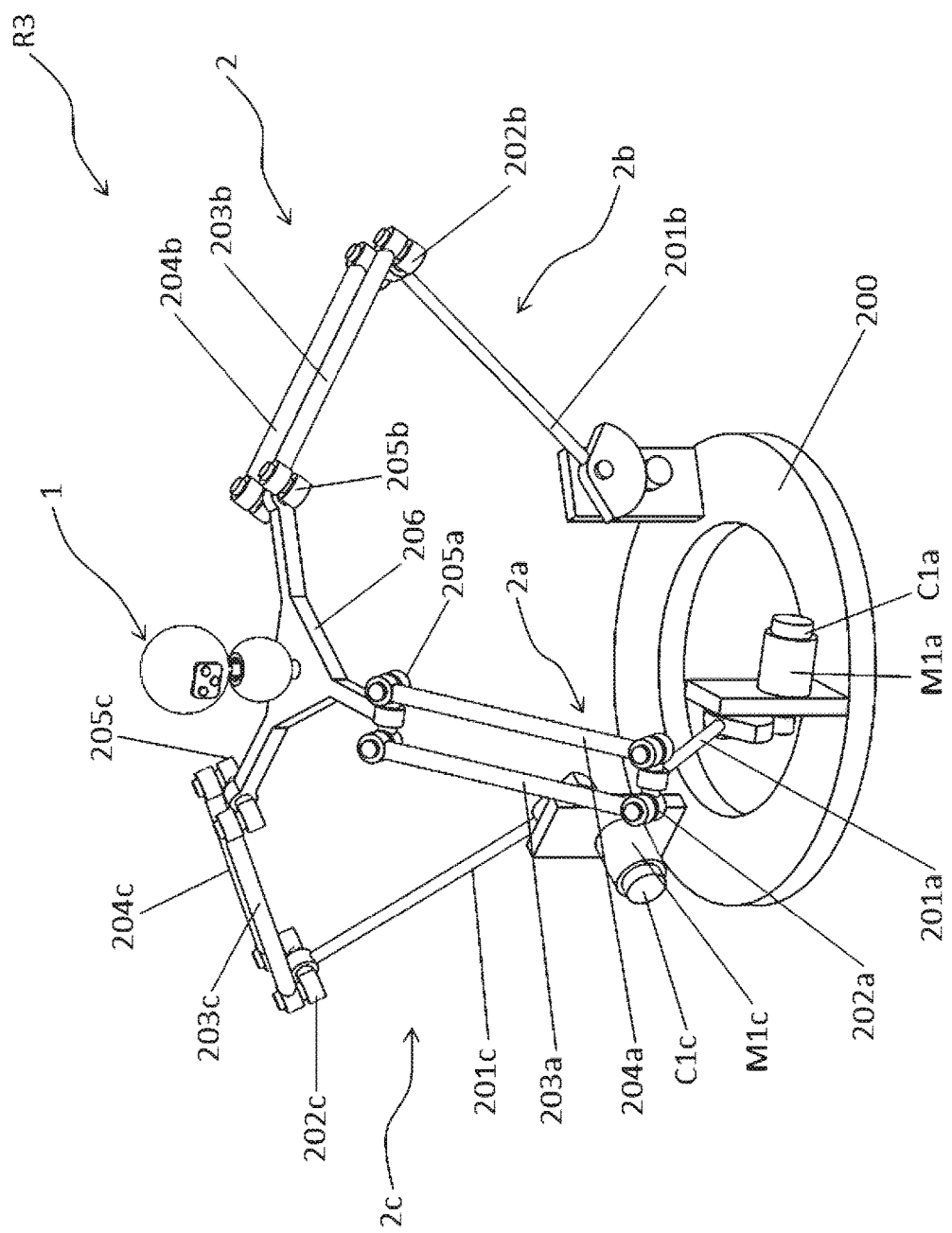
FIG. 20 is a perspective view of a control device comprising a parallel robot with 3 degrees of freedom.

In FIG. 20 may be seen another example of robot with parallel architecture with 3 degrees of freedom with force feedback of "modified Delta" type as described in the article Y. Tsumaki, H. Naruse, D. N. Nenchev, M. Uchiyama, *Design of a compact 6-DOF haptic interface, Proc. IEEE Int. Conf. on Robotics and Automation*, Louvain, Belgium, May 1998. The robot R3 comprises three legs 2a, 2b and 2c arranged in parallel and connecting the base 200 to the movable platform 206. The legs 2a, respectively 2b and 2c comprise movable bodies 201a, 202a, 203a, 204a, 205a, respectively 201b, 202b, 203b, 204b, 205b and 201c, 202c, 203c, 204c, 205c. The force feedback is ensured by the motors M1a on the leg 2a, M1b on the leg 2b and M1c on the leg 2c, equipped with position sensors C1a, C1b and C1c (in FIG. 20, the motor M1b and the position sensor C1b of the leg 2b are not visible). The motors are all three fixed on the base and actuate the bodies 201a, 201b and 201c through reducers not referenced in order not to encumber the figure. This architecture is well known to those skilled in the art and its operation will not be detailed herein.

This architecture only makes it possible to move the platform 206 in translation. The specific layout of the links between the bodies is such that the platform 206 cannot move in rotation. When the user is in free space, the robot is controlled such that the contact end and the contact area, of which the relative configuration is measured by the tracking system, do not come into contact with each other. When the user arrives in contact, the controller controls the motors so that the handle comes into contact with the robot. Finally, on contact, these two elements remain in contact with each other. In the example presented in FIG. 20, the grab area of the handle 1 advantageously has the shape of a ball that is more compact and more ergonomic than a stylet for controlling the system in translation.

In addition, in this type of device with 3 degrees of freedom, the contact end of the handle 1 and the contact area of the platform 206 are advantageously of spherical shape such as those represented in FIGS. 5A and 5B. The user may thus freely turn the handle around an axis here vertical. He may also freely turn the handle around any horizontal axis, as long as the thinned part 103 of the handle does not come into contact with the perimeter of the opening 209 of the cavity 403. Thus even if the user slightly modifies the orientation of the handle by moving the system in free space, this will not cause contact between the handle and the body of the robot.

Figure 21:
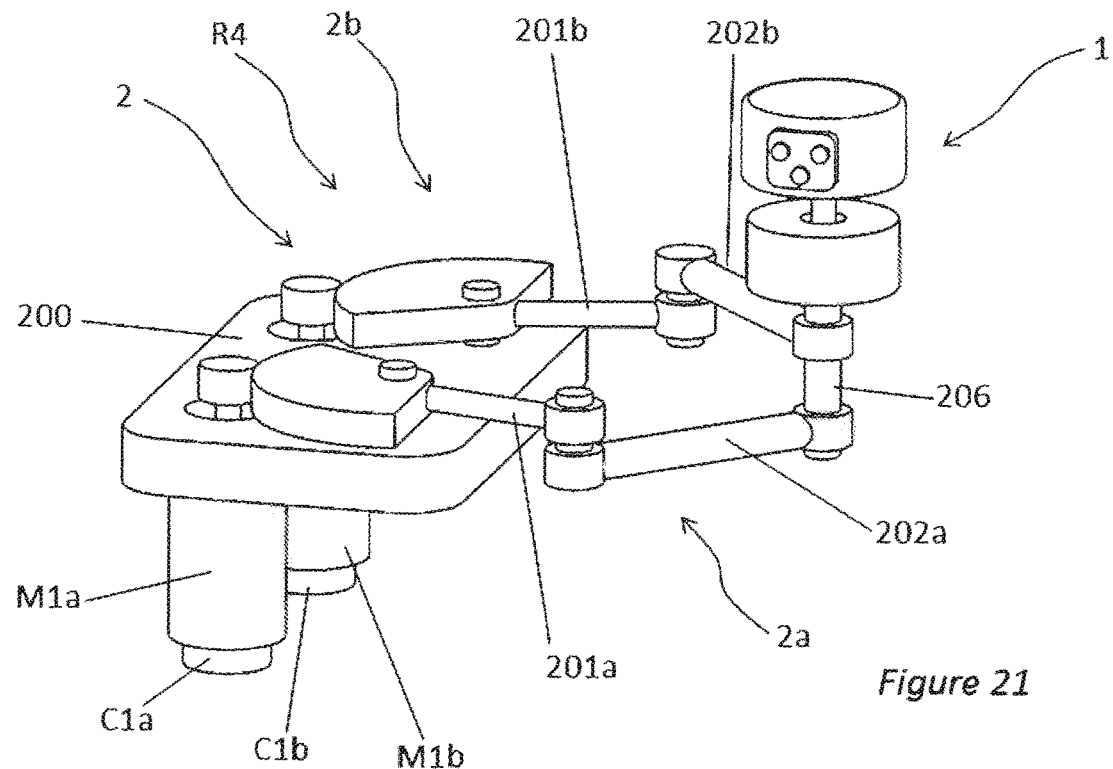
FIGS. 21 and 22 are perspective and partial sectional views of a control device comprising a parallel robot with 2 degrees of freedom.
Figure 22:
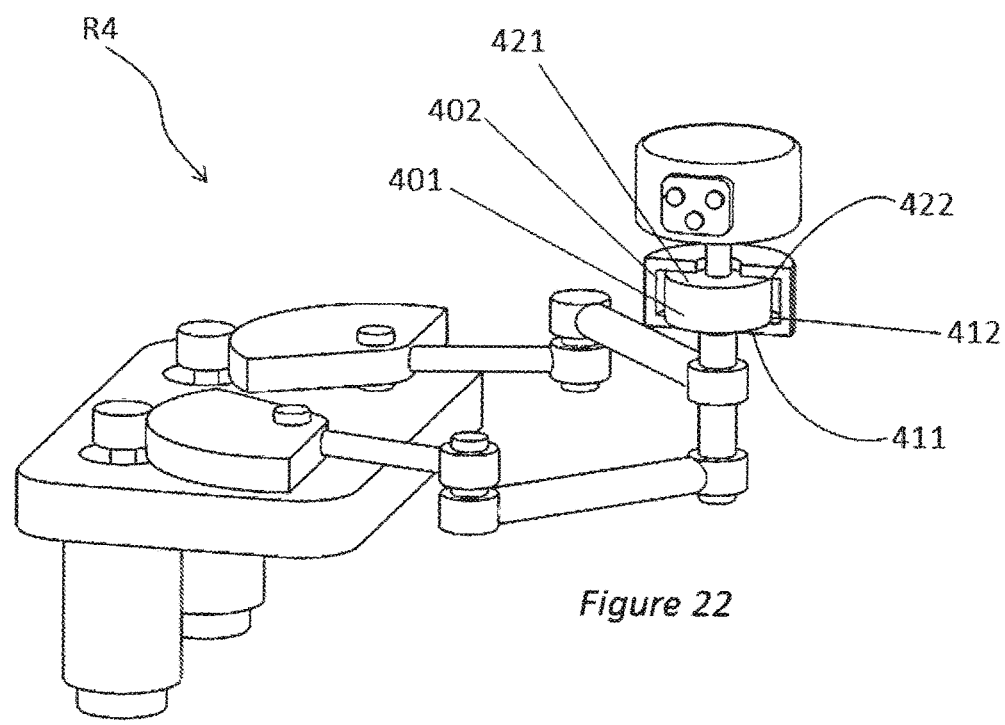

In FIGS. 21 and 22 may be seen another example of robot having two degrees of freedom that can be implemented in a device according to the present invention. The robot R4 comprises two legs 2a and 2b connecting a base 200 to a movable end part 206. The legs comprise bodies 201a and 202a, respectively 201b and 202b. Motors M1a and M1b equipped with position sensors C1a and C1b make it possible to apply a force to the terminal body 206 in the plane. This parallel structure with 2 degrees of freedom of 5-bar mechanism type is well known to those skilled in the art and its operation will not be detailed herein. It is only presented as an example. Any other structure with 2 degrees of freedom, in particular serial structures or parallel structures, for example of parallelogram type, could also be used.

In FIG. 22 may be seen a partial sectional view of the handle and the contact area of the device of FIG. 21. The handle globally has a cylindrical shape, which offers quite good ergonomics for movement in the plane. Any other shape could be used, such as for example a shape of computer mouse. The contact end 401 of the handle 1 and the contact area 402 of the terminal body 206 of the robot have for their part a cylindrical shape, respectively male and female. In this example, the height of the two cylinders is the same whereas their diameter differs. That of the contact end 401 is slightly smaller than that of the contact area 402. Thus any rotation of the handle is impossible, except around a vertical axis, and the user can only move it in the plane.

The lower 411 and upper 421 planes of the contact area 401 and the lower 412 and upper 422 planes of the contact area 402 may advantageously be made of materials having little mutual friction, such as for example Teflon®, in order to oppose a weak or even zero resistance to the relative movement of the handle relative to the terminal body in the plane during their placing in contact or their separation.

Alternatively or in combination with the implementation of materials offering low friction, these surfaces could also be lubricated to further minimise friction. Alternatively or in combination with the means cited above, beads could also be inserted between these surfaces.

Alternatively also the contact end 401 and the contact area 402 could have a parallelepiped shape and the body 202a or 202b could be provided with a motor making it possible to apply a torque to the body 206. In this case the robot R4 would have 3 degrees of freedom with force feedback in the plane, two in translation and one in rotation.

The examples of robots presented above have 6 degrees of freedom of which 3 to 6 with force feedback (FIG. 2), 6 degrees of freedom (FIG. 19), 3 degrees of freedom making it possible to act intermittently in space (FIG. 20) and 3 degrees of freedom of which two or three with force feedback to interact in the plane (FIGS. 21 and 22). But the robot could be redundant, with more than 6 motorised axes and a serial structure or not. It could also have a parallel architecture, for example of Gough-Stewart platform type. It could also have a hybrid architecture, for example with two legs in parallel and an axis in series as presented in the article F. Gosselin, F. Ferlay, S. Bouchigny, C. Mégard, F. Taha, *Specification and design of a new haptic interface for maxillo facial surgery, Proc. IEEE Int. Conf on Robotics and Automation*, 9-13 May 2011, Shanghai, China, pp. 737-744, or with a Delta type carrier and a series handle as in the article Y. Tsumaki, H. Naruse, D. N. Nenchev, M. Uchiyama, *Design of a compact 6-DOF haptic interface, Proc. IEEE Int. Conf. on Robotics and Automation*, Louvain, Belgium, Mai 1998. A 3D or 6D tensed string architecture could further be used as presented in the articles M. Ishii, M. Sato, *A 3D Spatial Interface Device Using Tensed Strings, Presence: Teleoperators and Virtual Environments*, Vol. 3 (1), pp. 81-86, 1994 Kim, Y. Koike, M. Sato, *Tension based 7 DOFs force feedback device: SPIDAR-G, Trans. on Control, Automation and Systems Engineering*, Vol. 4, No. 1, March 2002, and M. Ortega, S. Coquillart, *Prop-based haptic interaction with co-location and immersion: an automotive application, Proc. IEEE Int. Workshop on Haptic Audio

*Visual Environments and their Applications*, Ottawa, Canada, 1-2 Oct. 2005. An anthropomorphic architecture could also be used as on orthotic devices of the upper limb. These examples are given for indicative purposes and are not limiting.

A third embodiment of the invention will now be described, wherein the contact area is deformable.

Figure 23:
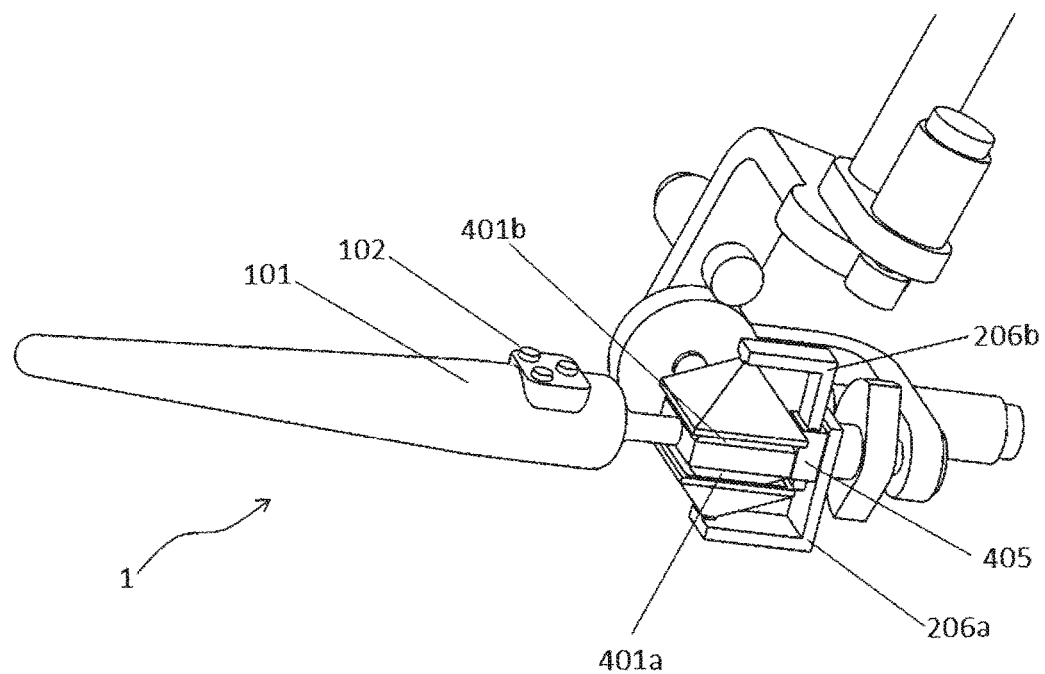
FIGS. 23 and 24 are perspective and partial sectional views of a first example of control device according to a third embodiment comprising a deformable contact area.

In FIG. 23 may be seen an example of a control device according to the third embodiment wherein the contact area is made deformable, at least on the side of the handle and/or the body 206.

Figure 24:
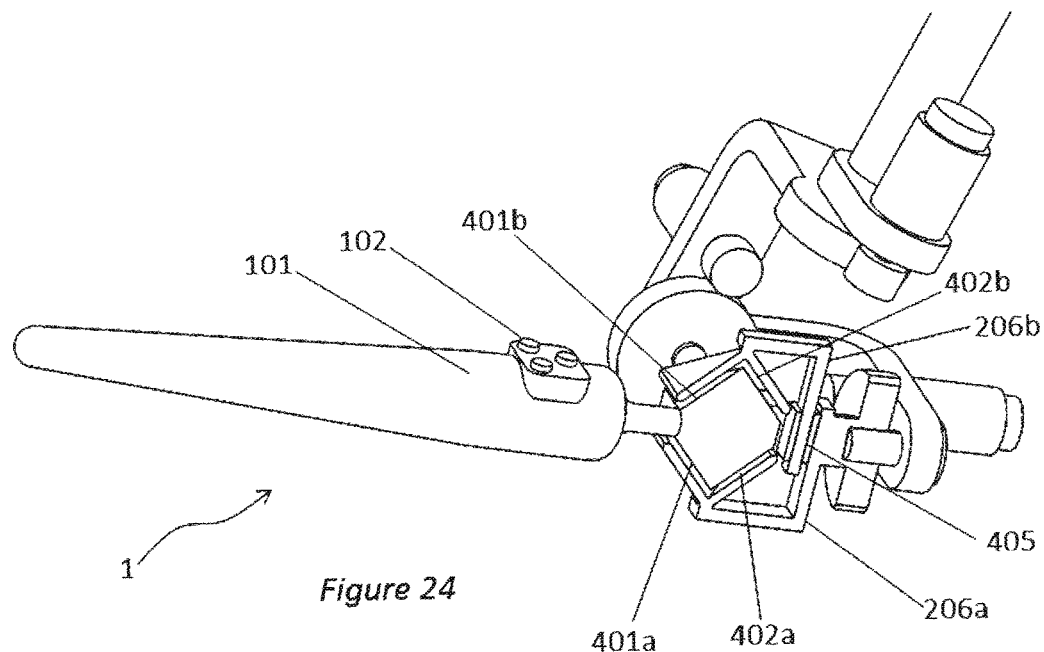

The structure and the operation of this device will be better understood by referring to FIG. 24 which represents a partial sectional view of the device of FIG. 23.

The end of the robot has a C-shape and comprises two bodies 206a, 206b. The first body 206a is secured to the pulley P62 and driven by the motor M6 and the second body 206b is translationally movable relative to the body 206a. The body 206b is driven by a motor 405, so as to make it possible to move away or to bring closer the bodies 206a and 206b.

It is clearly understood that the bodies 206a and 206b could also both be movable relative to the pulley P62 without going beyond the scope of the invention. In this case they could each be actuated by a motor or both in a synchronised manner by the same motor.

The structure of the two bodies 206a, 206b is such that they define between them a contact area with the contact end of the handle.

The contact end has a shape such that it cooperates with the two bodies 206a, 206b.

The first body 206a defines a first area of the total contact area, designated 402a and the second body defines a second area of the contact area, designated 402b.

The contact end comprises a first end 401a being able to cooperate with the first area 402a and a second end 401b being able to cooperate with the second area 402b.

The contact end is arranged relative to the bodies 206a, 206b such that the first end 401a is facing the first area 402a and the second end 401b is facing the area 402b.

Thus, in free space, the motor 405 is controlled such that the bodies 206a and 206b are relatively far from each other. Thus the first and second contact ends 401a and 401b cannot easily come into contact with the first 402a and second 402b contact areas. When the robot arrives in contact, the motor 405 is controlled so that the bodies 206a and 206b come closer to each other, such that the first contact end 401a and the first contact area 402a come closer and that the second contact end 401b and the second contact area 402b, also come closer, up to being in contact. Thus in contact, the handle is secured to the robot whereas in free space these two elements are separated. In the example represented, the motor 405 is a linear motor but it could also be a rotating motor. This motor may advantageously be provided with a position sensor (not represented). More generally, the motor 405 and the bodies 206a and 206b form a clamp which can close around the contact area(s) of the handle. Any other solution to realise this clamp could be used without going beyond the scope of the invention. These clamps could also be used for any type of shape of the contact areas. First and second contact ends 401a, 401b and first and second conical contact areas 402a, 402b could in particular be used. The contact ends 401a, 401b and the contact areas 402a, 402b could further be flat and maintained by simple pinching in contact. The contact area could further comprise more than one first and second contact area as will be described hereafter.

This embodiment makes it possible to manage as best as possible the transitions between free space and placing in contact, since it makes it possible to have a small distance between the surfaces 401 and 402 near to contact, a zero distance in contact and a large distance between these surfaces in free space.

When the contact area is modifiable, the information of distance of the driven device to its environment and the information of distance of the handle relative to the robot are used to drive the configuration of the contact area. Thus, on the device of FIGS. 23 and 24, it is possible for example to drive the motor 405 so that the distance between the contact areas 402a, 402b and the contact ends 401a, 401b, is equal to the distance between the robot and its environment as soon as the driven device approaches contact. This thus ensures that the distance between the handle and the robot will be zero as soon as the driven device comes into contact with its environment. This control step is represented in dotted lines in the flow diagram of FIG. 29.

It will be understood that it could also be possible that it is the relative configuration of the contact ends that is modifiable and not that of the contact areas. It could further be possible that both the relative configuration of the contact ends and that of the contact areas are modifiable. Furthermore any other method or control law, linear or not based on any useful information, making it possible to vary the distance between the contact ends and the contact areas could be used without going beyond the scope of the invention. It will also be understood that a similar approach may be used for all the variants where the contact end and/or the contact area is drivable.

Figure 25:
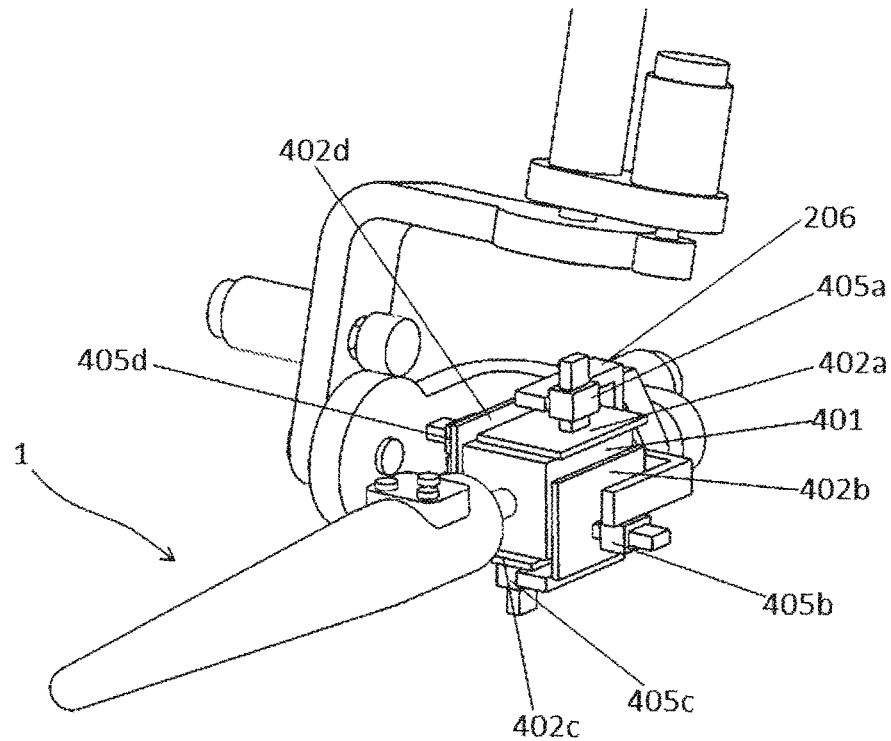
FIG. 25 is a perspective view of a variant of the device of FIGS. 23 and 24.

In FIG. 25 may be seen another example of realisation of the third embodiment wherein the contact area is formed of a first 402a, a second 402b, a third 402c and a fourth 402d contact area. These four contact areas are in the example represented each formed by a plane movable in translation relative to the body 206 and actuated by motors 405a, 405b, 405c and 405d so as to modify their distance to the contact end 401 of the handle 1 which is here parallelepiped but which could take any other shape, on condition that the areas 402a to 402d are suitable.

The operation of this device is similar to that of the device of FIGS. 23 and 24. In free space, the motors 405a to 405d are controlled so that the surfaces 402a to 402d are moved away from the faces of the contact end 401. On contact, they are controlled so that these contact areas are in contact with the faces of the contact end.

Generally speaking, these surfaces making up the deformable contact area realise a diaphragm which closes on the end of the handle. Any other solution to realise such a diaphragm could be used without going beyond the scope of the invention, in particular those having for principle synchronising the movements of the different movable parts. Any other shape could also be possible for the contact area. For example a contact area in pyramid or deformable sphere shape does not go beyond the scope of the present invention.

Figure 26:
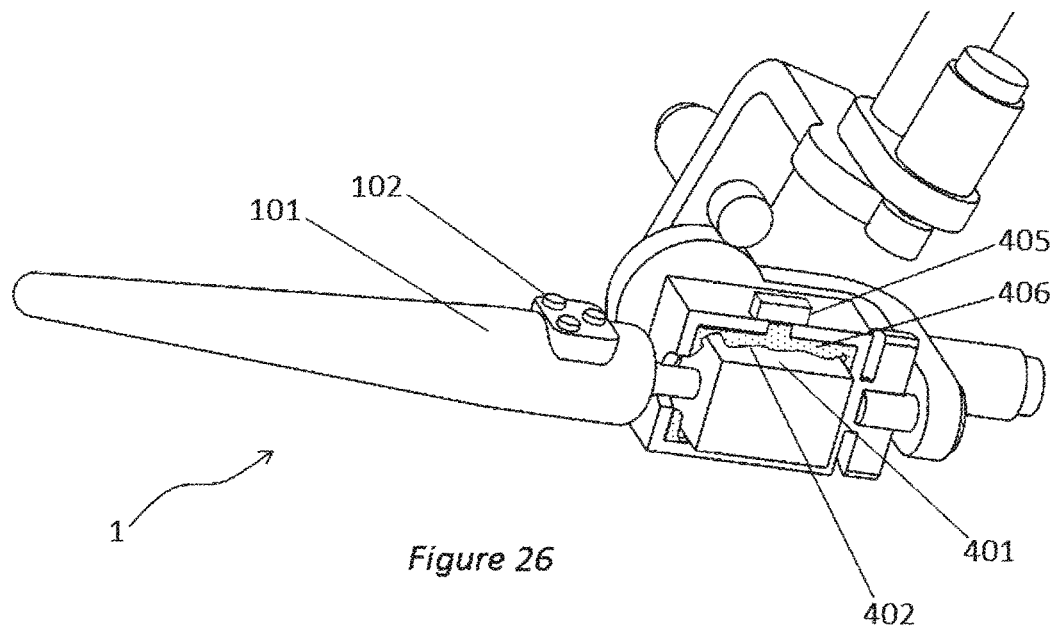
FIG. 26 is a partial sectional view of a second example of a control device according to the third embodiment.

In FIG. 26 may be seen represented another variant of the third embodiment of the contact area seen in partial section.

The terminal body 206 comprises on its inner face a flexible surface serving as contact area 402. The volume comprised between the inner face of the body 206 and this surface 402 is advantageously filled with a fine powder such as for example and in a non-limiting manner fine sand, iron filings, apricot stone powder or coffee grounds. A pump 405 and a reservoir (not represented) fixed on the body 206 or mounted further away for example on the base of the robot ensure, on command, the filling and the emptying of this volume. Thus in free space the powder is sucked up so as to free the space around the contact area 401 of the handle. In contact, on the contrary, powder is injected so as to bring the surface 402 down onto the surface 401. In an alternative, a substantially identical quantity of powder is kept but air is injected or conversely a vacuum is applied to make the powder deformable or to solidify it.

It will be understood that it could also be the contact surface 401 of the handle that could be deformable, for example swollen in contact in order to come into contact with the surface 402. The deformable surface could further be positioned outside of the surfaces 401 and 402. It could for example be connected to the body 206 and surround a part of the area 101 or be connected to the area 101 and surround a part of the body 206.

The devices of FIGS. 23 to 26 are only given as examples. Other devices capable of modifying the distance between the contact ends of the handle and the contact areas of the terminal body of the robot such that they are distant in free space and contiguous in contact could be used without going beyond the scope of the invention.

As has been explained above, since the avatar, the slave robot or the effector of the cobot is blocked in contact with its environment, the movement of the handle until coming into contact with the robot may be seen as a penetration into the environment or a protrusion of the handle relative to the avatar, the robot or the cobot. This protrusion is all the less when the distance between the contact end 401 and the contact area 402 is small. Thanks to the implementation of modifiable contact areas and/or contact ends, it is possible not to have any protrusion of the whole while reducing this distance to zero in contact. Since the distance between the ends and the contact areas is modifiable, it is also possible to have a large distance in free space so that the robot can follow the movements of the user even if he has a limited dynamic.

Figure 27:
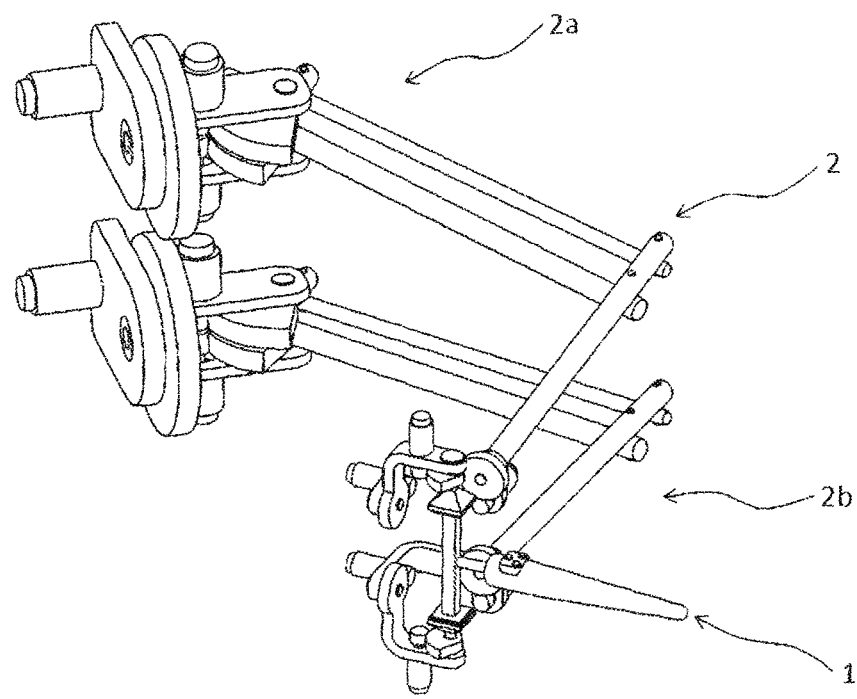
FIGS. 27 and 28 are perspective and detail views of a control device according to the third embodiment comprising a parallel robot.
Figure 28:
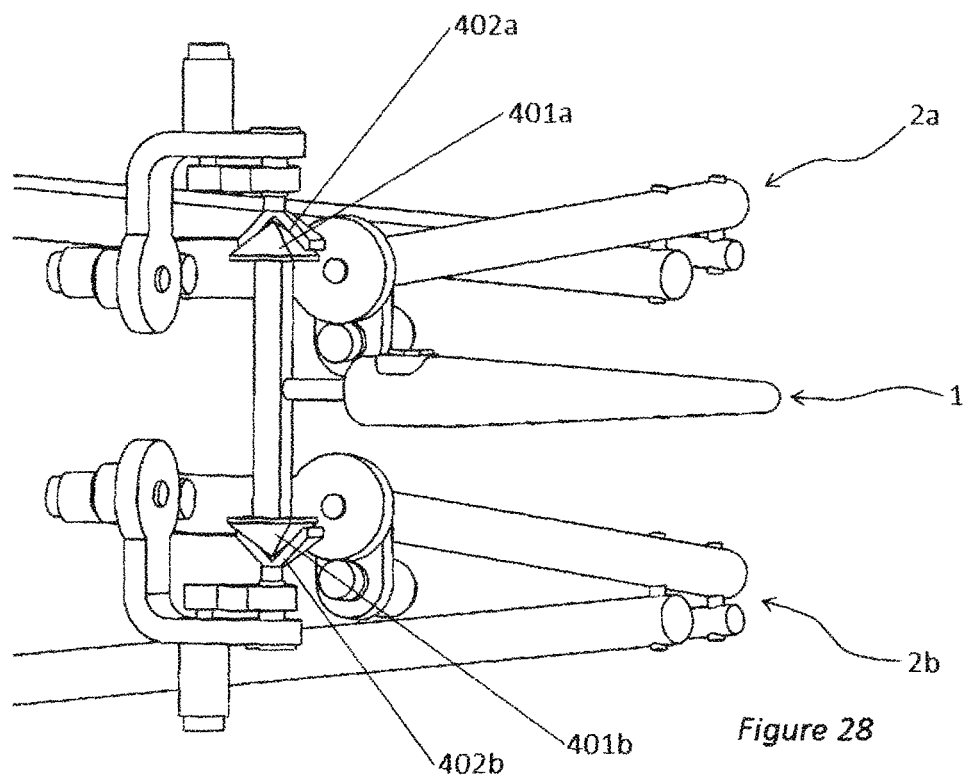

In FIGS. 27 and 28 may be seen an example of control device including several separate contact areas. The robot of FIG. 27 is a parallel robot 2 with two legs 2a and 2b, each leg 2a, 2b bearing a contact area 402a, 402b respectively. The handle 1 comprises two contact ends 401a, 401b.

The contact areas 402a, 402b are arranged in the example represented so as to face each other, the handle 1 being intended to be arranged between these two contact areas 402a, 402b, each contact end 401a, 401b of the handle facing a contact area. In this example, the contact ends 401a, 401b are of pyramidal shape and the contact areas have a corresponding shape. Any other shape making it possible to apply a multidirectional force feedback may be suitable.

In FIG. 27, the two legs of the robot have 6 degrees of freedom advantageously all actuated, which enables each leg to follow the movements of the handle in free space and to apply to it forces in contact. Certain or all the axes of the wrist of the legs 2a and 2b could not be actuated. In this case the terminal bodies of the two legs would follow the handle in rotation either by their placing in contact with the handle when said handle is inclined, or by incorporating advantageously on these axes self-alignment devices with the handle such as those shown in FIG. 10. This arrangement has the advantage of making it possible to regulate easily the distance between the ends of the legs 2a and 2b and the handle 1 by driving the two robots.

This robot configuration is only given as an example and different robots could be used or further more than 2 contact areas could be used. Thus it could be possible for example to develop a robot with 3 legs in parallel connected to the handle by 3 contact areas without going beyond the scope of the invention.

It will be understood that the different embodiments and variants of realisation of the robot, the handle, the tracking system and the contact area contact end may be combined without going beyond the scope of the invention.

The present invention makes it possible to realise perfectly transparent haptic interfaces in free space. Moreover, it makes it possible to realise haptic interfaces operating in a conventional manner in contact, with in particular bilateral forces in the 6 directions of space. In addition, it is simple to implement and may be adapted to existing interfaces.

The device according to the invention is suited to the realisation of any device having to perform complex movements while having great transparency, such as for example and in a non-limiting manner haptic interfaces, cobots, exoskeletons or robots interacting with humans via a tool or a handle.

These systems are for example particularly suited to simulators and surgical training systems and in the medical world. These applications in fact involve operations carried out with the aid of tools (scalpels, drills, etc.), which is a characteristic of our invention.

Thanks to the invention, it is possible to realise a haptic interface with an minimum apparent mass and minimum apparent friction in free space while supplying important forces in contact, which is a desire of surgeons. Moreover it may be provided to equip several grippers. It is then very easy to change it since the gripper may not be connected to the tool. It is thus possible to simulate easily interventions requiring the successive use of several tools.

The invention claimed is:

1. A control device with force feedback comprising:
   a handle configured to be operated by a user, the handle including at least one grab area for taking hold by the user and at least one contact end secured to the grab area during at least part of the operation of the control device;
   a robot including at least one terminal body including at least one contact area, the contact area being configured to come into contact with the contact end of the handle;
   at least one measuring device measuring relative configuration of the handle relative to the terminal body;
   a controller configured to manage movement of the contact area relative to the contact end in an operating state without contact, in an operating state of placing in contact the contact area and the contact end and in an operating state in contact during which a force feedback may be applied to the handle through the contact end;
   the contact end being movable relative to the contact area during at least part of the operation of the control device; and
   wherein the contact end and the contact area are shaped such that the contact area is configured to apply forces to the contact end in at least two separate directions such that the robot applies to the handle a force feedback in the at least two separate directions.

2. The control device with force feedback according to claim 1, wherein the contact end forms a cavity and the contact area is shaped such that it is housed at least in part in the cavity, or the contact area forms a cavity and the contact end is shaped such that it is housed at least in part in the cavity.

3. The control device with force feedback according to claim 2, comprising a play between the inner surfaces of the cavity of the contact end or the contact area and the outer surfaces of the contact area or the contact end, such that the relative movement of the contact end and the contact area is limited in all directions.

4. The control device with force feedback according to claim 3, wherein the contact end has a spherical shape and the contact area has a corresponding spherical shape or the contact end has a parallelepiped shape and the contact area has a corresponding parallelepiped shape.

5. The control device according to claim 1, wherein the contact area forms a cavity from which the contact end is free to exit, or the contact end forms a cavity from which the contact area is free to exit.

6. The control device with force feedback according to claim 5, wherein the contact end includes a cylindrical lateral wall and a hemispherical end wall and the contact area has a corresponding shape or wherein the contact end includes a conical or truncated cone lateral wall and the contact area has a corresponding shape.

7. The control device with force feedback according to claim 1, wherein the contact area and/or the contact end have a fixed shape.

8. The control device with force feedback according to claim 1, wherein the handle or the terminal body include a deformable element to come into contact with the terminal body or the handle respectively when the deformable element is deformed.

9. The control device with force feedback according to claim 1, wherein the contact area and/or the contact end are deformable.

10. The control device with force feedback according to claim 9, wherein the contact area or the contact end is delimited by plural surfaces of which at least one is movable relative to the other surfaces.

11. The control device with force feedback according to claim 9, wherein the contact area or the contact end is formed at least in part by a flexible wall, the placing in contact between the contact area and the contact end being ensured at least in part by deformation of the flexible wall.

12. The control device with force feedback according to claim 11, wherein the flexible wall delimits a closed chamber, the device further comprising a reservoir of material made of fine powder and a supplier for supplying material to the closed chamber, on command of the controller.

13. The control device with force feedback according to claim 1, wherein the at least one measuring device includes a camera or a time of flight camera configured to film the handle and the terminal body, a processor for processing images supplied by the at least one measuring device and a lighting device.

14. The control device with force feedback according to claim 13, wherein the handle or the terminal body comprises at least one locating target.

15. The control device with force feedback according to claim 14, wherein the at least one locating target emits a signal making it possible to distinguish it from another target.

16. The control device with force feedback according to claim 1, wherein the at least one measuring device is arranged on the handle and the terminal body, the at least one measuring device including tracking elements on the handle or the terminal body and sensors of the tracking elements.

17. The control device with force feedback according to claim 16, wherein the tracking elements are light emitting diodes and the sensors are phototransistors.

18. The control device with force feedback according to claim 1, further comprising a temporary securing device for securing the handle and the terminal body.

19. The control device with force feedback according to claim 18, wherein the temporary securing device is such that the securing is eliminated when a sufficient force is applied to the contact end.

20. The control device with force feedback according to claim 19, wherein the temporary securing device is a magnetic or mechanical device.

21. The control device with force feedback according to claim 18, wherein the temporary securing device is controllable to enable a cancellation of the securing on command.

22. The control device with force feedback according to claim 21, wherein the temporary securing device is an electromagnetic temporary securing device.

23. The control device with force feedback according to claim 1, further comprising at least one alignment system automatically modifying relative configuration of the handle and the terminal body of the robot in orientation.

24. The control device with force feedback according to claim 1, further comprising means for detecting contact between the contact end and the contact area.

25. The control device with force feedback according to claim 1, comprising at least two contact areas and at least two contact ends, the two contact areas being movable with respect to each other and/or the two contact ends being movable with respect to each other.

26. The control device with force feedback according to claim 1, wherein the robot is a serial robot with six degrees of freedom, a hybrid robot with 6 degrees of freedom, a parallel robot with three degrees of freedom, or a parallel robot with two or three degrees of freedom.

27. A haptic interface comprising: the control device with force feedback according to claim 1 and simulation software.

28. A master robot and slave robot system comprising: the control device with force feedback according to claim 1 and a slave robot, a master robot being formed by the robot of the control device.

29. A collaborative robot comprising: the control device with force feedback according to claim 1 and an effector acting on the environment, mounted on the terminal body or on a separate body.

30. The control device with force feedback according to claim 1, comprising at least one magnetic alignment system automatically modifying relative configuration of the handle and the terminal body of the robot in orientation.

* * * * *